US012595329B2

(12) United States Patent
Tsumura

(10) Patent No.: US 12,595,329 B2
(45) Date of Patent: Apr. 7, 2026

(54) METHOD FOR PRODUCING HOLLOW RESIN PARTICLES

(71) Applicant: ZEON CORPORATION, Tokyo (JP)

(72) Inventor: Ryo Tsumura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 833 days.

(21) Appl. No.: 17/800,590

(22) PCT Filed: Feb. 25, 2021

(86) PCT No.: PCT/JP2021/007008
§ 371 (c)(1),
(2) Date: Aug. 18, 2022

(87) PCT Pub. No.: WO2021/172402
PCT Pub. Date: Sep. 2, 2021

(65) Prior Publication Data
US 2023/0340176 A1 Oct. 26, 2023

(30) Foreign Application Priority Data

Feb. 25, 2020 (JP) ................................. 2020-029354
Feb. 25, 2020 (JP) ................................. 2020-029357
Feb. 25, 2020 (JP) ................................. 2020-029360

(51) Int. Cl.
*C08F 265/06* (2006.01)
*C08J 9/00* (2006.01)

(52) U.S. Cl.
CPC ........... *C08F 265/06* (2013.01); *C08J 9/0028* (2013.01); *C08J 2351/00* (2013.01)

(58) Field of Classification Search
CPC ........ C08F 265/06; C08F 220/14; C08F 2/18; C08F 6/24; C08J 9/0028; C08J 2351/00; B01J 13/02
USPC ........................................................ 523/332
See application file for complete search history.

(56) References Cited

U.S. PATENT DOCUMENTS

| | | | |
|---|---|---|---|
| 12,202,916 B2 * | 1/2025 | Hirata | ................ C08F 222/103 |
| 2010/0167165 A1 | 7/2010 | Masui et al. | |
| 2021/0087349 A1 | 3/2021 | Iga et al. | |
| 2024/0367132 A1 * | 11/2024 | Watanabe | ................ C08F 2/18 |
| 2024/0416313 A1 * | 12/2024 | Yagyu | ...................... C08F 2/44 |

FOREIGN PATENT DOCUMENTS

| | | |
|---|---|---|
| JP | 2002-080503 A | 3/2002 |
| JP | 2007-191694 A | 8/2007 |
| JP | 2016-190980 A | 11/2016 |
| JP | 2020-132820 A | 8/2020 |
| WO | 2019/026899 A1 | 2/2019 |

OTHER PUBLICATIONS

International Search Report dated Apr. 27, 2021, issued in counterpart Application No. PCT/JP2021/007008.
Notification of Transmittal of Translation of the International Preliminary Report on Patentability (Form PCT/IB/338) issued in counterpart International Application No. PCT/JP2021/007008 mailed Sep. 9, 2022, with Forms PCT/IB/373 and PCT/ISA/237. (7 pages).

* cited by examiner

*Primary Examiner* — Hannah J Pak
(74) *Attorney, Agent, or Firm* — WHDA, LLP

(57) ABSTRACT

Provided is a method for producing hollow resin particles in which a residual amount of a hydrocarbon solvent once held inside particles in a production process is reduced and particle breakage is suppressed. The method for producing hollow resin particles, which include preparing a mixture liquid containing a polymerizable monomer, a hydrocarbon solvent, a polymerization initiator and an aqueous medium, suspending the mixture liquid to prepare a suspension, subjecting the suspension to a polymerization reaction to prepare a precursor composition containing precursor particles having a hollow portion and including the hydrocarbon solvent in the hollow portion, and removing the hydrocarbon solvent from the precursor particles, wherein the polymerizable monomer contains a crosslinkable monomer in an amount of from 40% by mass to 100% by mass, and wherein the removal of the hydrocarbon solvent is performed by a specific method.

6 Claims, 4 Drawing Sheets

FIG. 6

METHOD FOR PRODUCING HOLLOW RESIN PARTICLES

TECHNICAL FIELD

The present disclosure relates to a method for producing hollow resin particles. More specifically, the present disclosure relates to a method for producing hollow resin particles having a reduced residual amount of a non-reactive hydrocarbon solvent once held inside the particles in a production process.

BACKGROUND ART

Hollow resin particles produced by polymerizing a polymerizable monomer are particles having a cavity inside the particles. The hollow resin particles can scatter light well and can reduce light transmissivity as compared to resin particles in which their interiors are practically filled with resin. Hence, hollow resin particles have been widely used in the applications of, for example, aqueous coating materials and paper coating compositions, as an organic pigment and a masking agent excellent in optical properties such as opacity and whiteness. Further, hollow resin particles have been used as an additive for a molded body such as a light reflecting plate, a heat insulating material and a sound insulating material.

Patent Literature 1 discloses a method in which a mixture containing a crosslinkable monomer or a mixture of a crosslinkable monomer and a monofunctional monomer, an initiator, and a sparingly water-soluble solvent, is dispersed in an aqueous solution of a dispersion stabilizer, and a suspension polymerization thereof is performed. The method disclosed in Patent Literature 1 aims to produce hollow polymer particles each having a single layer structure and a large void ratio by a short step and a simple method. Patent Literature 1 discloses, as a method of removing the solvent from the hollow portion, a method of drying hollow polymer particles in the form of a suspension or a powder under a condition of a temperature of 20° C. to 300° C. and a pressure of approximately 1 Pa to 100000 Pa, and a method such as spontaneous evaporation and a decompression treatment. In Example of Patent Literature 1, hollow polymer fine particles are isolated, and dried under a condition of a temperature of approximately 70° C. and a pressure of approximately 100000 Pa (under atmospheric pressure), whereby hexadecane (boiling point: 287° C.) in the core portion is evaporated.

Patent Literature 2 discloses a method in which a mixture solution containing a polyfunctional monomer and a non-reactive solvent is dispersed in an aqueous solution, and then the polyfunctional monomer is polymerized. The method disclosed in Patent Literature 2 aims to produce hollow resin particles having a large void ratio and sustained release by pores formed in the shell. Patent Literature 2 only discloses a method of heating hollow resin particles at T±10° C. where T is a boiling point of a non-reactive organic solvent, as a method of removing non-reactive organic solvents from hollow resin particles.

On the other hand, Patent Literature 3 discloses, as a method of producing hollow resin particles by heating and expanding thermally expandable microcapsules, a method of continuously supplying and discharging thermally expandable microcapsules in which a volatile liquid and/or a sublimable solid is included as an expanding agent in a polymer shell made of a thermoplastic polymer to an indirect heating type stirring dryer having a ratio (heat transfer area/effective volume) of the heat transfer area to the effective volume of 10 m$^{-1}$ or more.

CITATION LIST

Patent Literatures

[Patent Literature 1] Japanese Patent Application Laid-Open (JP-A) No. 2002-80503
[Patent Literature 2] JP-A No. 2016-190980
[Patent Literature 3] JP-A No. 2007-191694

SUMMARY OF INVENTION

Technical Problem

In a method for producing hollow resin particles by a suspension polymerization method polymerizing a polymerizable monomer in an aqueous medium, as a method for removing a sparingly water-soluble organic solvent from hollow resin particles, a method of drying hollow resin particles at a temperature around or below the boiling point of the organic solvent is conventionally employed as disclosed in Patent Literatures 1 and 2. However, the present inventor has found that, when a ratio of a crosslinkable monomer is increased in a polymerizable monomer forming a shell of hollow resin particles in order to increase the strength of the shell, a large amount of an organic solvent may remain inside the hollow resin particles even when the hollow resin particles are dried by a conventional method.

In view of the above circumstances, an object of the present disclosure is to provide a method for producing hollow resin particles, which can obtain hollow resin particles in which a residual amount of a hydrocarbon solvent once held inside particles in a production process is reduced and particle breakage is suppressed.

Solution to Problem

In a first embodiment, the method for producing hollow resin particles of the present disclosure is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, performing solid-liquid separation of the precursor composition to obtain the precursor particles separated from the aqueous medium, and heat-drying the precursor particles separated from the aqueous medium to remove the hydrocarbon solvent from the precursor particles, wherein the polymerizable monomer contains a crosslinkable monomer in an amount of from 40% by mass to 100% by mass, and wherein, with respect to a boiling point $T_1$ (° C.) of the hydrocarbon solvent and a thermal decomposition initiation temperature $T_2$ (° C.) of the precursor particles, a temperature $T_0$ (° C.) of the heat-drying for the removal of the hydrocarbon solvent satisfies $(T_1+70) \leq T_0 \leq (T_2-5)$.

In the production method of the first present disclosure, it is preferable that the boiling point $T_1$ of the hydrocarbon solvent is from 70° C. to 90° C.

In the production method of the first present disclosure, it is preferable that a void ratio of the hollow resin particles is from 50% to 95%.

In the production method of the first present disclosure, it is preferable that a pressure applied during the heat-drying for the removal of the hydrocarbon solvent is from 0 kPa to 101.3 kPa.

In the production method of the first present disclosure, it is preferable that the hydrocarbon solvent is a hydrocarbon solvent having 4 to 7 carbon atoms.

In the production method of the first present disclosure, it is preferable that a water content of the precursor particles used in the removal of the hydrocarbon solvent is 50% or less.

In the production method of the first present disclosure, it is preferable that the removal of the hydrocarbon solvent is performed by heat-drying and stirring simultaneously the precursor particles separated from the aqueous medium in combination with at least one kind of fine particles selected from the group consisting of inorganic fine particles and organic fine particles in a stirring vessel to coat a surface of the precursor particles with the fine particles and remove the hydrocarbon solvent from the precursor particles.

In a second embodiment, the method for producing hollow resin particles of the present disclosure is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, and removing the hydrocarbon solvent from the precursor particles, wherein the polymerizable monomer contains a crosslinkable monomer in an amount of from 40% by mass to 100% by mass, and wherein the removal of the hydrocarbon solvent from the precursor particles is performed by heat-drying and stirring simultaneously the precursor particles in a vertical stirring vessel equipped with a shaft extending in a gravity direction and stirring blades.

In the production method of the second present disclosure, it is preferable that a void ratio of the hollow resin particles is from 50% to 95%.

In the production method of the second present disclosure, it is preferable that, with respect to a boiling point $T_1$ (° C.) of the hydrocarbon solvent and a thermal decomposition initiation temperature $T_2$ (° C.) of the precursor particles, a temperature $T_0$ (° C.) of the heat-drying for the removal of the hydrocarbon solvent satisfies $T_1 \leq T_0 \leq (T_2-5)$.

In the production method of the second present disclosure, it is preferable that wherein the stirring vessel used in the removal of the hydrocarbon solvent is a cylindrical or conical vessel.

In the production method of the second present disclosure, it is preferable that the method further comprises performing solid-liquid separation of the precursor composition after the preparation of the precursor composition and before the removal of the hydrocarbon solvent to obtain the precursor particles separated from the aqueous medium.

In the production method of the second present disclosure, it is preferable that the removal of the hydrocarbon solvent is performed by heat-drying and stirring simultaneously the precursor particles in combination with at least one kind of fine particles selected from the group consisting of inorganic fine particles and organic fine particles in the stirring vessel to coat a surface of the precursor particles with the fine particles and remove the hydrocarbon solvent from the precursor particles.

In a third embodiment, the method for producing hollow resin particles of the present disclosure is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, and removing the hydrocarbon solvent from the precursor particles, wherein the polymerizable monomer contains a crosslinkable monomer in an amount of from 40% by mass to 100% by mass, and wherein the removal of the hydrocarbon solvent from the precursor particles is performed by heat-drying and stirring simultaneously the precursor particles in a horizontal stirring vessel equipped with a shaft extending in a horizontal direction and stirring blades.

In the production method of the third present disclosure, it is preferable that a void ratio of the hollow resin particles is from 50% to 95%.

In the production method of the third present disclosure, it is preferable that, with respect to a boiling point $T_1$ (° C.) of the hydrocarbon solvent and a thermal decomposition initiation temperature $T_2$ (° C.) of the precursor particles, a temperature $T_0$ (° C.) of the heat-drying for the removal of the hydrocarbon solvent satisfies $T_1 \leq T_0 \leq (T_2-5)$.

In the production method of the third present disclosure, it is preferable that the removal of the hydrocarbon solvent is performed by using a continuous dryer comprising a multi-axis horizontal stirring vessel equipped with a plurality of shafts extending in the horizontal direction and stirring blades.

In the production method of the third present disclosure, it is preferable that the method further comprises performing solid-liquid separation of the precursor composition after the preparation of the precursor composition and before the removal of the hydrocarbon solvent to obtain the precursor particles separated from the aqueous medium.

In the production method of the third present disclosure, it is preferable that the removal of the hydrocarbon solvent is performed by heat-drying and stirring simultaneously the precursor particles in combination with at least one kind of fine particles selected from the group consisting of inorganic fine particles and organic fine particles in the stirring vessel to coat a surface of the precursor particles with the fine particles and remove the hydrocarbon solvent from the precursor particles.

Advantageous Effects of Invention

According to the above-mentioned production method of the present disclosure, the hollow resin particles in which a residual amount of a hydrocarbon solvent once held inside particles in a production process is reduced and particle breakage is suppressed, can be produced.

BRIEF DESCRIPTION OF DRAWINGS

FIG. 6 is an AA cross-sectional view of the horizontal stirring dryer shown in FIG. 5.

DESCRIPTION OF EMBODIMENTS

Figure 1:
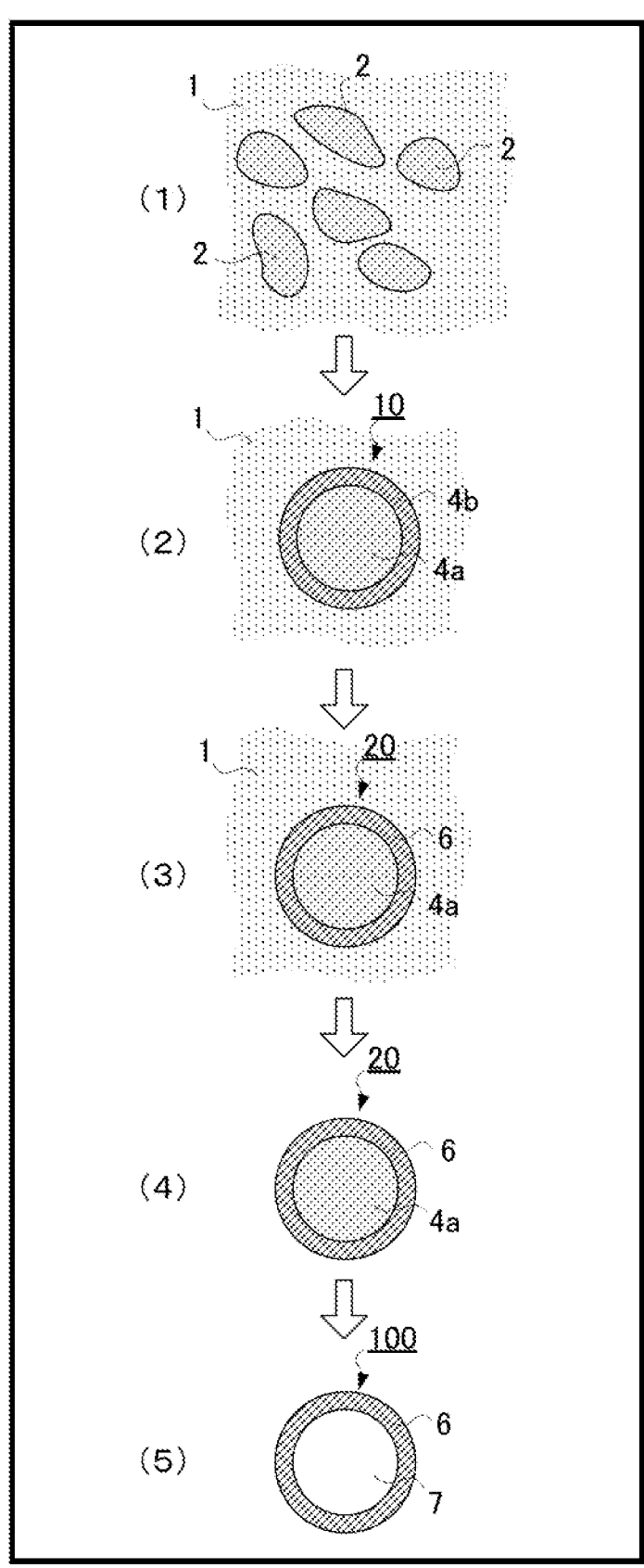
FIG. 1 is a diagram illustrating an example of the production method of the present disclosure.

In the present disclosure, the particles comprising a shell and a hollow portion surrounded by the shell, in which the hollow portion is filled with a hydrocarbon solvent are considered as an intermediate of the hollow resin particles obtained by the production method of the present disclosure, and they are referred to as "precursor particles". Also in the present disclosure, the composition containing the precursor particles is referred to as a "precursor composition".

In the present disclosure, the term "A to B" in a numerical range means that the numerical value described as A is included as the lower limit value and the numerical value described as B is included as the upper limit value.

In the present disclosure, the term "productivity" refers to a value (kg/(h·m$^3$)) obtained by dividing the weight (kg) of the obtained hollow resin particles by the heat-drying time (h) in the solvent removal step, and further dividing the obtained value by the effective volume (m$^3$) of the dryer used in the solvent removal step. In the hollow resin particles in which the residual amounts of the hydrocarbon solvent are sufficiently reduced, the higher the value (kg/(h·m$^3$)) is, the higher the productivity can be considered.

In the present disclosure, a vertical stirring is a stirring method performed using a stirring vessel equipped with a shaft extending in the gravity direction and stirring blades. A horizontal stirring is a stirring method performed using a stirring vessel equipped with a shaft extending in the horizontal direction and stirring blades. Here, the shaft extending in the gravity direction and the shaft extending in the horizontal direction may be slightly inclined within ±5° or the like with respect to the gravity direction and the horizontal direction, respectively.

In the present disclosure, a dryer that uses a vertical stirring vessel for drying may be referred to as a "vertical stirring dryer". A dryer that uses a horizontal stirring vessel for drying may be referred to as a "horizontal stirring dryer".

I-1. Method of the First Present Disclosure for Producing Hollow Resin Particles The method of the first present disclosure for producing hollow resin particles is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, performing solid-liquid separation of the precursor composition to obtain the precursor particles separated from the aqueous medium, and heat-drying the precursor particles separated from the aqueous medium to remove the hydrocarbon solvent from the precursor particles, wherein the polymerizable monomer contains a crosslinkable monomer in an amount of from 40% by mass to 100% by mass, and wherein, with respect to a boiling point $T_1$ (° C.) of the hydrocarbon solvent and a thermal decomposition initiation temperature $T_2$ (° C.) of the precursor particles, a temperature $T_0$ (° C.) of the heat-drying for the removal of the hydrocarbon solvent satisfies $(T_1+70) \leq T_0 \leq (T_2-5)$.

The production method of the first present disclosure follows the following basic technique: by carrying out a suspension treatment of a mixture liquid containing a polymerizable monomer, a hydrocarbon solvent, a polymerization initiator and an aqueous medium, phase separation is caused between the polymerizable monomer and the hydrocarbon solvent, and the suspension in which droplets having a distribution structure such that the polymerizable monomer is distributed on the surface side and the hydrocarbon solvent is distributed in the center, are dispersed in the aqueous medium, is prepared. By subjecting such suspension to a polymerization reaction, the surface of the droplets is cured to form the hollow resin particles having the hollow portion filled with the hydrocarbon solvent.

The hollow resin particles obtained by the above-mentioned basic technique are particles having a resin-containing shell (outer shell) and a hollow portion surrounded by the shell. The hollow portion is a hollow space clearly distinguished from the shell made from a resin material. The shell of the hollow resin particles may have a porous structure; however, in this case, the hollow portion has a size that can be clearly distinguished from many minute spaces uniformly dispersed in the porous structure.

In the hollow resin particles produced according to the basic technique as described above, the hollow portion is once filled with the hydrocarbon solvent in the manufacturing process. However, for example, when the hollow resin particles are used after being kneaded with other materials such as resin, if the hollow resin particles include a hydrocarbon solvent, the hydrocarbon solvent in the hollow resin particles may volatilize and foam, or may cause ignition. Further, as compared with hollow resin particles hardly including a hydrocarbon solvent, hollow resin particles having a large content of a hydrocarbon solvent have a problem that the effect of the hollow resin particles as a weight reducing material is inferior because of their high specific gravity. Therefore, there is a demand for hollow resin particles in which a hydrocarbon solvent is sufficiently removed.

On the other hand, in the hollow resin particles produced by setting the proportion of a crosslinkable monomer contained in the polymerizable monomer as from 40% by mass to 100% by mass, a strong shell is formed since the covalent bond network is tightly strung in the shell. In such hollow resin particles, since the hydrocarbon solvent present in the hollow portion hardly permeates through the shell, it has been difficult to sufficiently remove the hydrocarbon solvent by a conventional method.

In the production method of the first present disclosure, first, the precursor particles including the hydrocarbon solvent are separated from the aqueous medium, and then heat-dried at a temperature of not less than the temperature of the "boiling point $T_1$ ($^\circ$ C.) of the hydrocarbon solvent+ 70$^\circ$ C." and not more than the temperature of the "thermal decomposition initiation temperature $T_2$ of the precursor particles−5$^\circ$ C.", whereby the hydrocarbon solvent can be sufficiently removed from the precursor particles while suppressing breakage of the particles.

The effect of reducing the residual amount of the hydrocarbon solvent in the hollow resin particles by the production method of the first present disclosure is particularly effectively exhibited when the hollow resin particles comprising a shell having no communication hole and no shell defect are produced.

In general, there are hollow resin particle in which the shell does not have a communication hole communicating between the hollow portion and the external space of the particles and the hollow portion is isolated from the outside of the particle by the shell, and hollow resin particles in which the shell has one or two or more communication holes and the hollow portion communicates with the outside of the particles via the communication holes. The diameter of the communication hole of the hollow resin particle is appropriately adjusted depending on the size of the hollow resin particle, and it is generally from 10 nm to 500 nm. In the present disclosure, the shell defect of the hollow resin particle means a crack-shaped defect which is extremely large relative to the size of the hollow resin particle. Although it depends on the size of the hollow resin particle, a crack having a length of 1 μm or more generally extremely deteriorates the strength of the hollow resin particle. Hence, it is recognized as a shell defect.

When the shell of the hollow resin particles has the communicating hole or the shell defect, there is a problem that the hollow resin particles are likely to collapse when kneaded with another material such as a resin, or the other material is likely to penetrate the interior of the hollow resin particle from the communicating hole or the shell defect. Therefore, there is a demand for a hollow resin particle having a shell that has no communication hole and no shell defect.

In the present disclosure, the case where the shell does not have a communication hole or a shell defect encompasses the case where the shell does not substantially have a communication hole or a shell defect. If, as a result of SEM observation of 100 hollow resin particles, the number of hollow resin particles having a communication hole or a shell defect is 5 or less, the produced hollow resin particles are considered not to have a communication hole or a shell defect.

Hollow resin particles comprising a shell having no communication hole and no shell defect can be produced, for example, by using a bifunctional crosslinkable monomer as a crosslinkable monomer included in a polymerizable monomer forming the shell in the production method of the first present disclosure. It is presumed that, when the crosslinkable monomer included in the polymerizable monomer is bifunctional, the polymerization rate of the polymerizable monomer in the polymerization step does not become too fast, and the shell is less likely to be distorted, and then the communication hole and the shell defect are hardly formed in the shell.

The production method of the first present disclosure includes the steps (1) to (5) below. The method may further include other steps. In any production method in the present disclosure, as far as technically possible, two or more of the above steps and other additional steps may be simultaneously carried out as one step, or their order may be changed and then they may be carried out in that order. For example, the preparation and suspension of the mixture liquid may be simultaneously carried out in one step (e.g., the mixture liquid may be suspended while adding the materials for the mixture liquid).

(1) Mixture Liquid Preparation Step

This step includes preparing a mixture liquid containing a polymerizable monomer, a hydrocarbon solvent, a polymerization initiator and an aqueous medium.

(2) Suspension Step

This step includes suspending the mixture liquid to prepare a suspension in which droplets of a monomer composition containing the polymerizable monomer, the hydrocarbon solvent and the polymerization initiator are dispersed in the aqueous medium.

(3) Polymerization Step

This step includes subjecting the suspension to a polymerization reaction to prepare a precursor composition containing precursor particles having a hollow portion and including the hydrocarbon solvent in the hollow portion.

(4) Solid-Liquid Separation Step

This step includes performing solid-liquid separation of the precursor composition to obtain the precursor particles separated from the aqueous medium.

(5) Solvent Removal Step

This step includes heat-drying the precursor particles separated from the aqueous medium to remove the hydrocarbon solvent from the precursor particles.

FIG. 1 is a schematic diagram showing an example of the production method of the first present disclosure. The diagrams (1) to (5) in FIG. 1 correspond to the steps (1) to (5) described above, respectively. White arrows between the diagrams indicate the order of the steps. FIG. 1 is merely a schematic diagram for description, and the production method of the first present disclosure is not limited to the method shown in FIG. 1. Further, the structures, dimensions and shapes of materials used for the production methods of the present disclosure are not limited to the structures, dimensions and shapes of various materials shown in these diagrams.

The diagram (1) of FIG. 1 is a schematic cross-sectional view showing an embodiment of the mixture liquid in the mixture liquid preparation step. As shown in the diagram, the mixture liquid contains an aqueous medium 1 and a low polarity material 2 dispersed in the aqueous medium 1. Here, the low polarity material 2 means a material that has low polarity and is less likely to mix with the aqueous medium 1. In the present disclosure, the low polarity material 2 contains the polymerizable monomer, the hydrocarbon solvent, and the polymerization initiator.

The diagram (2) of FIG. 1 is a schematic cross-sectional view showing an embodiment of the suspension in the suspension preparation step. The suspension contains the aqueous medium 1 and a droplet 10 of the polymerizable monomer composition dispersed in the aqueous medium 1. The droplet 10 of the polymerizable monomer composition contains the polymerizable monomer, the hydrocarbon solvent, and the polymerization initiator; however, their distribution in the droplet is not uniform. The droplet 10 of the polymerizable monomer composition has the following structure: phase separation occurs between the hydrocarbon solvent (hydrocarbon solvent 4a) and a material 4b which is other than the hydrocarbon solvent and which contains the polymerizable monomer and the polymerization initiator; the hydrocarbon solvent 4a is distributed in the center; the material 4b other than the hydrocarbon solvent is distributed on the surface side.

The diagram (3) of FIG. 1 is a schematic cross-sectional view showing an embodiment of the precursor composition after the polymerization step. The precursor composition contains the aqueous medium 1 and a precursor particle 20 dispersed in the aqueous medium 1. A shell 6 forming the outer surface of the precursor particle 20 is formed by polymerization of the polymerizable monomer contained in the droplet 10 of the polymerizable monomer composition. The hollow portion in the interior of the shell 6 is filled with the hydrocarbon solvent 4a.

The diagram (4) of FIG. 1 is a schematic cross-sectional view showing an embodiment of the precursor particle after the solid-liquid separation step. The precursor particle after the solid-liquid separation step is a precursor particle 20 separated from the aqueous medium 1 contained in the precursor composition shown in the diagram (3) of FIG. 1.

The diagram (5) of FIG. 1 is a schematic cross-sectional view showing an embodiment of the hollow resin particle after the solvent removal step. The hollow resin particle 100 after the solvent removal step is a particle obtained by removing the hydrocarbon solvent 4a from the precursor particle 20 after the solid-liquid separation step shown in the diagram (4) of FIG. 1. The hollow resin particle 100 has a hollow portion 7 in the interior of the shell 6.

Hereinbelow, the above-mentioned steps (1) to (5) which the production method of the first present disclosure includes, and other steps which the production method of the first present disclosure may further include are described in order.

(1) Mixture Liquid Preparation Step

This step includes preparing a mixture liquid containing a polymerizable monomer, a hydrocarbon solvent, a polymerization initiator and an aqueous medium. The mixture liquid may further contain other materials such as a suspension stabilizer.

[Polymerizable Monomer]

The polymerizable monomer is a compound having a polymerizable functional group. As the polymerizable monomer, a compound having an ethylenically unsaturated bond as a polymerizable functional group, is generally used.

In the present disclosure, the polymerizable monomer includes at least a crosslinkable monomer, and may further include a non-crosslinkable monomer. The non-crosslinkable monomer is a polymerizable monomer having only one polymerizable functional group. The crosslinkable monomer is a polymerizable monomer having two or more polymerizable functional groups and being able to form crosslinking in a resin by a polymerization reaction. Since the crosslinkable monomer has a plurality of polymerizable functional groups, by including a crosslinkable monomer as the polymerizable monomer, the monomers can be linked to each other in the polymerization step, and the crosslinking density of the shell can be increased.

Examples of the crosslinkable monomer include a bifunctional crosslinkable monomer such as divinylbenzene, divinylbiphenyl, divinylnaphthalene, diallyl phthalate, allyl (meth)acrylate, ethylene glycol di(meth)acrylate and pentaerythritol di(meth)acrylate; and a trifunctional or higher-functional crosslinkable monomer such as trimethylolpropane tri(meth)acrylate, ditrimethylolpropane tetra(meth)acrylate, pentaerythritol tri(meth)acrylate, pentaerythritol tetra(meth)acrylate and dipentaerythritol hexa(meth)acrylate. Among them, from the viewpoint that a communication hole and a shell defect are not likely to be formed in the shell, a bifunctional crosslinkable monomer is preferred, divinylbenzene, ethylene glycol di(meth)acrylate and pentaerythritol di(meth)acrylate are more preferred, and ethylene glycol di(meth)acrylate and pentaerythritol di(meth)acrylate are still more preferred.

These crosslinkable monomers may be used alone or in combination of two or more thereof.

In the present disclosure, (meth)acrylate means each of acrylate and methacrylate, and (meth)acryl means each of acryl and methacryl.

As the non-crosslinkable monomer, a monovinyl monomer is preferably used. The monovinyl monomer is a compound having one polymerizable vinyl functional group.

As the monovinyl monomer, examples include, but are not limited to, a (meth)acrylic monovinyl monomer such as methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate and (meth)acrylic acid; an aromatic vinyl monomer such as styrene, vinyltoluene, α-methylstyrene, p-methylstyrene and halogenated styrene; a monoolefin monomer such as ethylene, propylene and butylene; a (meth)acrylamide monomer such as (meth)acrylamide, N-methylol (meth)acrylamide and N-butoxymethyl (meth)acrylamide, and derivatives thereof; a diene monomer such as butadiene and isoprene; a carboxylic acid vinyl ester monomer such as vinyl acetate; a vinyl halide monomer such as vinyl chloride; a vinylidene halide monomer such as vinylidene chloride; and a vinylpyridine monomer.

From the viewpoint that the polymerization reaction can be easily stable and hollow resin particles with high heat resistance can be obtained, as the monovinyl monomer, a (meth)acrylic monovinyl monomer is preferred, and at least one selected from (meth)acrylic acid, butyl acrylate and methyl methacrylate is more preferred.

These non-crosslinkable monomers may be used alone or in combination of two or more thereof.

The polymerizable monomer used in the present disclosure contains the crosslinkable monomer in an amount of from 40% by mass to 100% by mass with respect to 100% by mass of the polymerizable monomer. Since the amount of the crosslinkable monomer is equal to or larger than the lower limit value, the content ratio of the crosslinkable monomer unit in the shell of the hollow resin particles is large enough. Accordingly, the covalent bond network is tightly strung in the shell. As a result, the hollow resin particles are excellent in strength, less likely to collapse, and less likely to deform even with respect to heat or the like applied from the outside. From the viewpoint of improving the strength of the hollow resin particles, the content ratio of the crosslinkable monomer is preferably 50% by mass or more, more preferably 60% by mass or more, and still more preferably 70% by mass or more. On the other hand, from the viewpoint of suppressing the generation of the communication hole and the shell defect in the shell, the content ratio of the crosslinkable monomer is preferably 90% by mass or less, and more preferably 80% by mass or less.

The polymerizable monomer used in the present disclosure may contain the non-crosslinkable monomer in an amount of 60% by mass or less. When the polymerizable monomer include the non-crosslinkable monomer, the generation of the communication hole and the shell defect in the shell is likely to be suppressed.

When the polymerizable monomer include the non-crosslinkable monomer, with respect to 100% by mass of the polymerizable monomer including the crosslinkable monomer and the non-crosslinkable monomer, the non-crosslinkable monomer is contained in an amount of preferably 10% or more, and more preferably 20% or more. When the content ratio of the non-crosslinkable monomer is equal to or larger than the lower limit value, the generation of the communication hole and the shell defect in the shell is more likely to be suppressed. On the other hand, from the viewpoint of sufficiently including the crosslinkable monomer to improve the strength and heat resistance of the hollow resin particles, the content ratio of the non-crosslinkable monomer is preferably 50% by mass or less, and more preferably 40% by mass or less.

The content of the polymerizable monomer (total amount of the non-crosslinkable monomer and the crosslinkable monomer) in the mixture liquid is not particularly limited. It is generally from 15% by mass to 55% by mass, and more preferably from 25% by mass to 40% by mass, with respect to 100% by mass of the total mass of the components in the mixture liquid excluding the aqueous medium, from the viewpoint of the balance of the void ratio, particle diameter and mechanical strength of the hollow resin particles, and reducing the residual amount of the hydrocarbon solvent.

[Hydrocarbon Solvent]

In the present disclosure, the hydrocarbon solvent is used as a non-polymerizable, sparingly water-soluble organic solvent. The hydrocarbon solvent serves as a spacer material for forming the hollow portion in the interior of the particles.

The type of the hydrocarbon solvent is not particularly limited. Examples of the hydrocarbon solvent include a saturated hydrocarbon solvent such as butane, pentane, n-hexane, cyclohexane, heptane and octane, an aromatic hydrocarbon solvent such as benzene, toluene and xylene, and a solvent with relatively high volatility such as carbon disulfide and carbon tetrachloride.

In the hydrocarbon solvent, the amount of the saturated hydrocarbon solvent is preferably 50% by mass or more, with respect to the total amount (100% by mass) of the hydrocarbon solvent, since sufficient phase separation occurs in the droplets of the polymerizable monomer composition. As a result, hollow resin particles having only one hollow portion can be easily obtained, and the production of porous particles can be suppressed. The amount of the saturated hydrocarbon solvent is preferably 60% by mass or more, and more preferably 80% by mass or more, from the point of view that the production of porous particles is further suppressed, and that the hollow portions of the hollow resin particles are likely to be uniform.

The hydrocarbon solvent is preferably a hydrocarbon solvent having 4 to 7 carbon atoms. A hydrocarbon compound having 4 to 7 carbon atoms can be easily included in the precursor particles in the polymerization step and can be easily removed from the precursor particles in the solvent removal step. A hydrocarbon solvent having 5 or 6 carbon atoms is particularly preferred.

The hydrocarbon solvent is preferably a hydrocarbon solvent having a boiling point of 90° C. or less, and more preferably a hydrocarbon solvent having a boiling point of 85° C. or less, from the viewpoint of ease of removal in the solvent removal step described later. The hydrocarbon solvent is preferably a hydrocarbon solvent having a boiling point of 70° C. or more, and more preferably a hydrocarbon solvent having a boiling point of 75° C. or more, from the viewpoint that the hydrocarbon solvent can be easily included in the precursor particles.

In the present disclosure, when the hydrocarbon solvent is a mixed solution containing several types of hydrocarbon solvents and it has several boiling points, the boiling point of the hydrocarbon solvent is determined as the boiling point of the solvent having the highest boiling point among the solvents contained in the mixed solvent, that is, the highest boiling point of the several boiling points.

The relative permittivity at 20° C. of the hydrocarbon solvent is preferably 3 or less. The relative permittivity is an index of the level of the polarity of a compound. In the case where the relative permittivity of the hydrocarbon solvent is 3 or less and sufficiently small, it is presumed that phase separation progresses rapidly in the droplets of the polymerizable monomer composition and a hollow portion is easily formed.

Examples of the solvents having a relative permittivity at 20° C. of 3 or less, are as follows. The inside of the parentheses is the value of relative permittivity.

Heptane (1.9), cyclohexane (2.0), benzene (2.3), and toluene (2.4).

For the relative permittivity at 20° C., values written in known literatures (tor example, The Chemical Society of Japan, as editor, "Kagaku Binran, Kiso Hen, Kaitei 4 Ban", pp. II-498 to II-503, published by Maruzen Publishing Co., Ltd. on Sep. 30, 1993) and other technical information may be used as reference. Examples of the method of measuring the relative permittivity at 20° C. include a relative permittivity test that is in conformity with 23 of JIS C 2101:1999 and is performed with the measuring temperature set to 20° C.

The void ratio of the hollow resin particles can be controlled by changing the amount of the hydrocarbon solvent in the mixture liquid. In the suspension step described later, the polymerization reaction progresses while droplets of the polymerizable monomer composition include the hydrocarbon solvent. Accordingly, as the content of the hydrocarbon solvent increases, the void ratio of the obtained hollow resin particle likely to increase.

In the present disclosure, with respect to the total mass (100 parts by mass) of the polymerizable monomer, the content of the hydrocarbon solvent in the mixture liquid is preferably from 50 parts by mass to 500 parts by mass, from the following viewpoints: the particle diameter of the hollow resin particles is easily controlled; the void ratio is easily increased while maintaining the strength of the hollow resin particles; and the amount of the hydrocarbon solvent remaining in the particles is easily reduced. With respect to the total mass (100 parts by mass) of the polymerizable monomer, the content of the hydrocarbon solvent in the mixture liquid is preferably from 60 parts by mass to 400 parts by mass, more preferably from 70 parts by mass to 300 parts by mass, and still more preferably from 80 parts by mass to 200 parts by mass.

[Polymerization Initiator]

In the present disclosure, an oil-soluble polymerization initiator is preferably used as a polymerization initiator. By using an oil-soluble polymerization initiator as a polymerization initiator, the polymerization initiator is incorporated inside the droplet of a polymerizable monomer composition in a suspension obtained in the suspension step described later.

The oil-soluble polymerization initiator is not particularly limited, as long as it is a lipophilic one having a solubility in water of 0.2% by mass or less. Examples of the oil-soluble polymerization initiator include benzoyl peroxide, lauroyl peroxide, t-butyl peroxide 2-ethylhexanoate, 2,2'-azobis(2, 4-dimethylvaleronitrile) and azobis(isobutyronitrile).

The content of the polymerization initiator is preferably from 0.1 parts by mass to 10 parts by mass, more preferably from 0.5 parts by mass to 7 parts by mass, and still more preferably from 1 part by mass to 5 parts by mass, with respect to the total amount (100% by mass) of the polymerizable monomer contained in the mixture liquid. When the content of the oil-soluble polymerization initiator is from 0.1 parts by mass to 10 parts by mass, a polymerization reaction can progress sufficiently; the polymerization initiator is less likely to be left after the end of the polymerization reaction; and an unexpected side reaction is less likely to progress.

[Polar Resin]

In the present disclosure, the mixture liquid may further contain a polar resin. In the present disclosure, the polar resin is selected from the group consisting of polymers containing a repeating unit which contains a heteroatom. As the polar polymer, examples include an acrylic resin, a polyester resin, and a vinyl resin containing a heteroatom.

The polar resin may be a homopolymer or copolymer of heteroatom-containing monomers, or may be a copolymer of a heteroatom-containing monomer and a heteroatom-free monomer. When the polar resin is a copolymer of a heteroatom-containing monomer and a heteroatom-free monomer, from the viewpoint of easily controlling the particle diameter and shell thickness of the hollow resin particles, in 100% by mass of all the repeating units constituting the copolymer, the amount of the heteroatom-containing monomer unit is preferably 50% by mass or more, more preferably 70% by mass or more, and still more preferably 90% by mass or more.

As the heteroatom-containing monomer for the polar resin, examples include, but are not limited to, a (meth) acrylic monovinyl monomer such as methyl (meth)acrylate, ethyl (meth)acrylate, butyl (meth)acrylate, 2-ethylhexyl (meth)acrylate, lauryl (meth)acrylate, acrylic acid, methacrylic acid, 2-hydroxyethyl (meth)acrylate, 2-hydroxypropyl (meth)acrylate, 4-hydroxybutyl (meth) acrylate, methoxypolyethylene glycol (meth) acrylate, dimethylaminoethyl (meth)acrylate, diethylaminoethyl (meth)acrylate, glycidyl (meth)acrylate, and 4-hydroxybutyl acrylate glycidyl ether; an aromatic vinyl monomer containing a heteroatom, such as halogenated styrene and styrene sulfonate; a carboxylic acid vinyl ester monomer such as vinyl acetate; a vinyl halide monomer such as vinyl chloride; a vinylidene halide monomer such as vinylidene chloride; a vinylpyridine monomer; a carboxyl group-containing monomer such as an ethylenically unsaturated carboxylic acid monomer such as crotonic acid, cinnamic acid, itaconic acid, fumaric acid, maleic acid and butene tricarboxylic acid; and an epoxy group-containing monomer such as allyl glycidyl ether. These heteroatom-containing monomers may be used alone or in combination of two or more thereof.

As the heteroatom-free monomer for the polar resin, examples include, but are not limited to, an aromatic vinyl monomer not containing a heteroatom, such as styrene, vinyltoluene, α-methylstyrene and p-methylstyrene; a monoolefin monomer such as ethylene, propylene and butylene; and a diene monomer such as butadiene and isoprene. These heteroatom-free monomers may be used alone or in combination of two or more thereof.

From the viewpoint of high compatibility with the polymerizable monomer and easily controlling the particle diameter and shell thickness of the hollow resin particle, the polar resin is preferably an acrylic resin. In the acrylic resin, with respect to 100% by mass of all the repeating units constituting the resin, the total mass of the (meth)acrylic monovinyl monomer unit is preferably 50% by mass or more, more preferably 70% by mass or more, and still more preferably 90% by mass or more. The polar resin is particularly preferably an acrylic resin in which all the repeating units constituting the resin are composed of the (meth)acrylic monovinyl monomer unit.

In the polar resin, from the viewpoint of easily controlling the particle diameter and shell thickness of the hollow resin particles, it is particularly preferable that the heteroatom-containing monomer contains a polar group-containing monomer unit that contains at least one kind of polar group selected from a carboxyl group, a hydroxyl group, a sulfonic acid group, an amino group, a polyoxyethylene group and an epoxy group. Of them, at least one selected from a carboxyl group and a hydroxyl group is preferred from the point of view that the particle diameter can be controlled by adding a small amount thereof.

As the polar group-containing monomer, examples include, but are not limited to, a carboxyl group-containing monomer such as an ethylenically unsaturated carboxylic acid monomer such as acrylic acid, methacrylic acid, crotonic acid, cinnamic acid, itaconic acid, fumaric acid, maleic acid and butene tricarboxylic acid; a hydroxyl group-containing monomer such as 2-hydroxyethyl (meth)acrylate, 2-hydroxypropyl (meth)acrylate and 4-hydroxybutyl (meth) acrylate; a sulfonic acid group-containing monomer such as styrenesulfonic acid; an amino group-containing monomer such as dimethylaminoethyl (meth) acrylate and diethylaminoethyl (meth)acrylate; a polyoxyethylene group-containing monomer such as methoxypolyethylene glycol (meth)acrylate; and an epoxy group-containing monomer such as glycidyl (meth)acrylate, allyl glycidyl ether and 4-hydroxybutyl acrylate glycidyl ether. These polar group-containing monomers may be used alone or in combination of two or more thereof.

When the polar resin contains the polar group-containing monomer unit, it is preferable that the polar group is present in at the end of the main chain or that of a side chain, or the polar group is bound to the main chain or a side chain in a pendant form, from the point of view that the particle diameter and shell thickness of the hollow resin particles can be easily controlled.

When the polar resin does not contain the polar group-containing monomer unit, from the viewpoint of high compatibility with the polymerizable monomer and easily controlling the particle diameter and shell thickness of the hollow resin particles, the polar resin preferably contains a monomer unit derived from alkyl (meth)acrylate as the heteroatom-containing monomer unit. Especially from the viewpoint of high polarity, the polar resin preferably contains a monomer unit derived from alkyl (meth)acrylate in which the alkyl group has 3 or less carbon atoms, more preferably a monomer unit derived from alkyl (meth)acrylate in which the alkyl group is a methyl group or an ethyl group, and still more preferably a monomer unit derived from alkyl (meth)acrylate in which the alkyl group is a methyl group.

From the viewpoint of high compatibility with the polymerizable monomer and easily controlling the particle diameter and shell thickness of the hollow resin particles, the acrylic resin as the polar resin is preferably a polymer or copolymer of polymerizable monomers for polar resin, which include 50.0% by mass or more of methyl methacrylate with respect to the total mass (100% by mass) of the polymerizable monomer for polar resin. In the present disclosure, the polymerizable monomer used for synthesis of the polar resin is referred to as the "polymerizable monomer for polar resin".

The acrylic resin as the polar resin is more preferably a copolymer of polymerizable monomers for polar resin, which include 50.0% by mass or more and 99.9% by mass or less of methyl methacrylate and 0.1% by mass or more and 5.0% by mass or less of the polar group-containing monomer, still more preferably a copolymer of polymerizable monomers for polar resin, which include 50.0% by mass or more and 99.0% by mass or less of methyl methacrylate and 0.1% by mass or more and 5.0% by mass or less of the polar group-containing monomer, even more preferably a copolymer of polymerizable monomers for polar resin, which include 50.0% by mass or more and 98.0% by mass or less of methyl methacrylate, 1.0% by mass or more and 5.0% by mass or less of a (meth)acrylic monovinyl monomer being unlike methyl methacrylate and not containing the polar group, and 0.1% by mass or more and 5.0% by mass or less of the polar group-containing monomer, and particularly preferably a copolymer of polymerizable monomers for polar resin, which include 50.0% by mass or more and 98.0% by mass or less of methyl methacrylate, 1.0% by mass or more 5.0% by mass or less of a (meth)acrylic monovinyl monomer being unlike methyl methacrylate and not containing the polar group, and 0.2% by mass or more and 3.0% by mass or less of the polar group-containing monomer.

As the (meth)acrylic monovinyl monomer which is unlike methyl methacrylate and which does not contain the polar group, at least one selected from ethyl acrylate and butyl acrylate is preferred, and ethyl acrylate is particularly preferred, from the point of view that glass transition temperature can be controlled.

As the polar group-containing monomer, from the viewpoint of compatibility with the polymerizable monomer, a (meth)acrylic monovinyl monomer containing the polar group is preferred. Moreover, from the point of view that the particle diameter can be controlled by adding a small amount thereof, a (meth)acrylic monovinyl monomer containing a carboxyl group or hydroxyl group is more preferred, and (meth)acrylic acid is particularly preferred.

The polar resin can be obtained by, tor example, polymerizing polymerizable monomers for polar resin, which include the heteroatom-containing monomer, by a polymerization method such as solution polymerization or emulsion polymerization.

When the polar resin is a copolymer, the copolymer may be any one of a random copolymer, a block copolymer and a graft copolymer. The polar resin is preferably a random copolymer.

From the viewpoint of increasing the solubility, the polar resin is preferably finely pulverized.

The number average molecular weight (Mn) of the polar resin is not particularly limited. The polystyrene equivalent number average molecular weight (Mn) of the polar resin measured by gel permeation chromatography (GPC) using tetrahydrofuran is preferably from 3000 to 20000, more preferably from 4000 to 17000, and still more preferably from 6000 to 15000. When the number average molecular weight (Mn) of the polar resin is equal to or more than the lower limit, the solubility of the polar resin is increased, and the particle diameter and shell thickness of the hollow resin particles can be easily controlled. When the number average molecular weight of the polar resin is equal to or lower than the upper limit, a decrease in the strength of the shell can be suppressed.

When the mixture liquid contains the polar resin, the content of the polar resin is preferably from 0.1 parts by mass to 10 parts by mass, more preferably from 0.3 parts by mass to 8.0 parts by mass, and still more preferably from 0.5 parts by mass to 8.0 parts by mass, with respect to 100 parts by mass of the polymerizable monomer. When the content of the polar resin is equal to or more than the lower limit, the particle diameter and shell thickness of the hollow resin particles can be easily controlled. On the other hand, when the content of the polar resin is equal to or lower than the upper limit, a decrease in the strength of the shell can be suppressed.

[Suspension Stabilizer]

In the present disclosure, it is preferable that the mixture liquid contain a suspension stabilizer. The suspension stabilizer is not limited as long as it is one that disperse droplets of the polymerizable monomer composition in an aqueous medium in the suspension step described later.

Examples of the suspension stabilizer include a surfactant. As the surfactant, any of cationic surfactants, anionic surfactants and nonionic surfactants can be used, and any of them can be used in combination. Of these, anionic surfactants and nonionic surfactants are preferred, and anionic surfactants are more preferred.

Examples of the anionic surfactant include sodium dodecylbenzenesulfonate, sodium lauryl sulfate, sodium dialkylsulfosuccinate and formalin condensate salts of naphthalenesulfonic acid.

Examples of the nonionic surfactant include polyoxyethylene alkyl ether, polyoxyethylene alkyl ester and polyoxyethylene sorbitan alkyl ester.

Examples of the cationic surfactant include didecyldimethylammonium chloride and stearyltrimethylammonium chloride.

As the suspension stabilizer, a sparingly water-soluble inorganic compound may be used. When the mixture liquid contains the polar resin, it is preferable that sparingly water-soluble inorganic compound is used as the suspension stabilizer, from the viewpoint of easily controlling the particle diameter of the hollow resin particles. Examples of the sparingly water-soluble inorganic compound include sulfates such as barium sulfate, and calcium sulfate; carbonates such as barium carbonate, calcium carbonate, and magnesium carbonate; phosphates such as calcium phosphate; metal oxides such as aluminum oxide, and titanium oxide; metal hydroxides such as aluminum hydroxide, magnesium hydroxide, calcium hydroxide, barium hydroxide, and ferric hydroxide. Among them, metal hydroxides are preferred, and magnesium hydroxide is particularly preferred.

In the present disclosure, the sparingly water-soluble inorganic compound is preferably an inorganic compound such that the solubility in 100 g of water is 0.5 g or less.

The content of the suspension stabilizer is preferably from 0.1 parts by mass to 4 parts by mass, and more preferably from 0.5 part by mass to 3 parts by mass, with respect to the total mass (100% by mass) of the polymerizable monomer contained in the mixture liquid. When the content of the suspension stabilizer is 0.1 parts by mass or more, the droplets of the polymerizable monomer composition are likely to be formed in the aqueous medium. On the other hand, when the content of the suspension stabilizer is 4 parts by mass or less, a decrease in productivity due to foaming hardly occurs in the step of removing the hydrocarbon solvent.

[Aqueous Medium]

In the present disclosure, the term "aqueous medium" means a medium selected from the group consisting of water, a hydrophilic solvent and a mixture of water and a hydrophilic solvent.

The hydrophilic solvent in the present disclosure is not particularly limited, as long as it is one that mixes with water sufficiently and does not develop phase separation. Examples of the hydrophilic solvent include alcohols such as methanol and ethanol; tetrahydrofuran (THF); and dimethyl sulfoxide (DMSO).

Among the aqueous medium, water is preferably used in terms of its high polarity. When a mixture of water and a hydrophilic solvent is used, from the viewpoint of forming the droplets of the polymerizable monomer composition, it is important that the polarity of the entire mixture is not too low. In this case, for example, the mixing ratio (mass ratio) between water and the hydrophilic solvent may be set to water:hydrophilic solvent=99:1 to 50:50 or the like.

The mixture liquid is obtained by mixing the above-mentioned materials and other materials as needed, and appropriately stirring or the like the mixture. In the mixture liquid, an oil phase containing the lipophilic materials such as the polymerizable monomer, the polymerization initiator and the hydrocarbon solvent, is dispersed with a size of a particle diameter of approximately several millimeters in an aqueous phase containing the suspension stabilizer, the aqueous medium, etc. The dispersion state of these materials in the mixture liquid can be observed with the naked eye, depending on the types of the materials.

In the mixture liquid preparation step, the mixture liquid may be obtained by simply mixing the above-mentioned materials and other materials as needed, and appropriately stirring or the like the mixture. From the point of view that the shell composition is likely to be uniform, it is preferable to prepare the mixture liquid by separately preparing the oil phase and the aqueous phase in advance, and then mixing the phases together.

(2) Suspension Step

The suspension step includes carrying out a suspension treatment of the mixture liquid to prepare a suspension in which the droplets of the polymerizable monomer composition containing the polymerizable monomer, the hydrocarbon solvent and the polymerization initiator are dispersed in the aqueous medium.

The suspension method for forming the droplets of the polymerizable monomer composition is not particularly limited. For example, it is performed using an apparatus capable of performing strong stirring, such as an (in-line type) emulsifying disperser (manufactured by Pacific Machinery & Engineering Co., Ltd.; product name: MILDER) or a high-speed emulsifying disperser (manufactured by PRIMIX Corporation; product name: T.K. HOMO-MIXER MARK II Type).

In the suspension prepared in the suspension step, the droplets having a particle diameter of approximately from 1.0 μm to 100.0 μm of the polymerizable monomer composition containing the above-mentioned lipophilic material containing the polymerizable monomer, the polymerization initiator and the hydrocarbon solvent and are dispersed uniformly in the aqueous medium. Such droplets of the polymerizable monomer composition are difficult to be observed with the naked eye and can be observed with known observation equipment such as an optical microscope.

In the suspension step, since phase separation occurs in the droplets of the polymerizable monomer composition, the hydrocarbon solvent with low polarity is likely to collect in the interior of the droplets. As a result, in the obtained droplets, the hydrocarbon solvent is distributed in the interior thereof, and the materials other than the hydrocarbon solvent are distributed at the periphery thereof.

Figure 2:
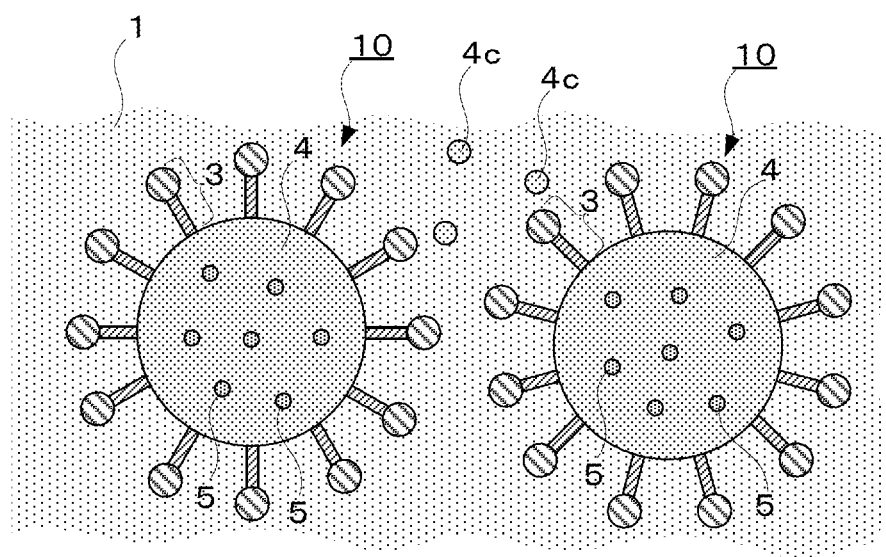
FIG. 2 is a schematic diagram showing an embodiment of a suspension used in the production method of the present disclosure.

FIG. 2 is a schematic diagram showing an embodiment of the suspension in the suspension step. Each droplet 10 of the polymerizable monomer composition in FIG. 2 schematically shows a cross section thereof. FIG. 2 is merely a schematic diagram, and the suspension in the present disclosure is not limited to that shown in FIG. 2.

FIG. 2 shows a situation where the droplets 10 of the polymerizable monomer composition and polymerizable monomers 4c are dispersed in the aqueous medium 1. Each droplet 10 is formed by the oil-soluble polymerizable monomer composition 4 and a suspension stabilizer 3 surrounding the periphery of the oil-soluble polymerizable monomer composition 4. The polymerizable monomer composition 4 contains the polymerization initiator 5, and the polymerizable monomer and the hydrocarbon solvent (both of them are not illustrated).

Each droplet 10 of the polymerizable monomer composition is a minute oil droplet which contains the polymerizable monomer composition 4, and the polymerization initiator 5 generates polymerization initiating radicals in the interior of the minute oil droplet. Therefore, the precursor particles with a target particle diameter can be produced without excessively growing the minute oil droplet.

The suspension polymerization shown in FIG. 2 does not provide an opportunity for the polymerization initiator 5 to come into contact with the polymerizable monomer 4c dispersed in the aqueous medium 1, since the polymerization initiator 5 is taken into the droplet 10 of the polymerizable monomer composition. Thus, the generation of surplus polymer particles (e.g., solid particles having a relatively small particle diameter) in addition to the target resin particles having the hollow portion can be suppressed. As the polymerization initiator 5 taken into the inside of the droplet 10 of the polymerizable monomer composition, an oil-soluble polymerization initiator is generally used.

(3) Polymerization Step

This step includes subjecting the suspension to a polymerization reaction to prepare the precursor composition containing the precursor particles having the hollow portion and including the hydrocarbon solvent in the hollow portion.

In the polymerization step, the polymerizable monomer in the droplets of the polymerizable monomer composition is polymerized while the droplets include the hydrocarbon solvent. Accordingly, the precursor particles are formed, which are composed of the shell containing a resin which is a polymer obtained by polymerization of the polymerizable monomer, and the hollow portion filled with the hydrocarbon solvent.

In the production method of the first present disclosure, the droplets of the polymerizable monomer composition are subjected to a polymerization reaction while the hydrocarbon solvent is included in them. Accordingly, the polymerization reaction is likely to progress while the shape of the droplets is retained, and the size and void ratio of the precursor particles can be easily controlled. Since the polymerizable monomer and the hydrocarbon solvent are used together, the polarity of the hydrocarbon solvent is low with respect to the shell of the precursor particles, and the hydrocarbon solvent is not easily compatible with the shell. Accordingly, sufficient phase separation occurs and only one hollow portion is likely to be formed. Also, the size and void ratio of the precursor particles can be easily controlled by controlling the amount of the hydrocarbon solvent.

The polymerization system is not particularly limited. For example, a batch system, a semicontinuous system or a continuous system may be employed. The polymerization temperature is preferably from 40° C. to 80° C., and more preferably from 50° C. to 70° C. The polymerization reaction time is preferably from 1 hour to 20 hours, and more preferably from 2 hours to 15 hours.

(4) Solid-Liquid Separation Step

This step includes performing solid-liquid separation of the above-mentioned precursor composition to obtain the precursor particles which includes the hydrocarbon solvent and is separated from the aqueous medium.

The method of performing solid-liquid separation of the precursor composition is not particularly limited, and a known method may be used. Examples of the solid-liquid separation method include a centrifugation method, a filtration method, and still-standing separation. Among them, a centrifugation method or a filtration method may be employed, and from the viewpoint of simplicity of the operation, a filtration method may be employed.

In this step, a preliminary drying may be performed at a time after the solid-liquid separation of the precursor composition and before performing the solvent removal step described later. The preliminary drying is a drying for removing the residual aqueous medium from a solid obtained by the solid-liquid separation of the precursor composition without removing the hydrocarbon solvent from the precursor particles. It is preferable that the preliminary drying is performed as needed such that the water content of the precursor particles obtained by this step falls in the preferable range to be described later.

The preliminary drying is preferably performed, for example, under a temperature condition of lower than or equal to a temperature 100° C. lower than the temperature $T_0$ (° C.) of the heat-drying in the solvent removal described later, that is, lower than or equal to a temperature of "$T_0$–100(° C.)", from the viewpoint of removing the aqueous medium without removing the hydrocarbon solvent from the precursor particles. Further, the temperature of the preliminary drying is generally 40° C. or higher in order to sufficiently remove the aqueous medium.

In addition, the pressure at the time of performing the preliminary drying may be adjusted within a range of from 0 kPa to 101.3 kPa and within a range of being able to suppress breakage of the precursor particles, depending on the temperature of the preliminary drying.

The preliminary drying may be performed by a known drying method. For example, it may be performed by using a drying apparatus such as a dryer or a drying instrument such as a hand dryer, or the like. It may be also performed by the same method as in the solvent removal described later.

(5) Solvent Removal Step

This step includes heat-drying the precursor particles separated from the aqueous medium to remove the hydrocarbon solvent from the precursor particles.

In this step, the hollow resin particles filled with gas are obtained by heat-drying in a gaseous atmosphere the precursor particles obtained in the above-mentioned solid-liquid separation step, and replacing the hydrocarbon solvent in the interior of the precursor particles with a gas. The term "in a gaseous atmosphere" includes "in an environment where no liquid components exist in the outside of the precursor particles" and "in an environment where only a very small amount of liquid components at a level that does not influence the removal of the hydrocarbon solvent exist in the outside of the precursor particles" in a strict sense. The term "in a gaseous atmosphere" can be reworded as a state where the precursor particles do not exist in a slurry, or it can be reworded as a state where the precursor particles exist in a dry powder. That is, in this step, it is important to remove the hydrocarbon solvent in an environment where the precursor particles come into direct contact with the outside gas.

The precursor particles used in the solvent removal step have a water content of preferably 50% or less, and more preferably of from 15% to 45% while the water content is not particularly limited. When the water content of the precursor particles is within the above range, the flowability of the precursor particles at the time of stirring-drying the precursor particles is improved. Accordingly, the conveyance property of the precursor particles to the stirring vessel and the drying efficiency of the precursor particles are improved, and the drying time is shortened. In addition, since the heat transfer efficiency is improved by suppressing the adhesion of the powder to the stirring blades, the productivity can be improved.

In the present disclosure, the water content can be calculated by the following formula (i).

$$\text{Water content (\%)}=\{(w1-w2)/w1\}\times100 \qquad \text{Formula (i)}$$

where w1 represents the mass of the measurement sample, w2 represents the mass of the measurement sample after being dried for 1 hour at 105° C. and then cooled to 25° C.

Further, it is preferable that the permeability (%) of the hydrocarbon solvent from the precursor particles is 5% or less. The permeability of the hydrocarbon solvent is determined as a change rate of the mass (w3) of the precursor particles A which are obtained by static drying the precursor particles used in the solvent removal step at 40° C. for 24 hours, and the mass (w4) of the precursor particles B which are obtained by further subjecting the precursor particles A to static drying at 105° C. for 2 hours and then cooling them to 25° C. While the permeability of the hydrocarbon solvent is preferably 5% or less from the viewpoint of strength of the shell, it is preferably more than 3% from the viewpoint of improving productivity.

The permeability of the hydrocarbon solvent can be calculated by the following formula (ii).

$$\text{Permeability (\%) of hydrocarbon solvent}=\{(w3-w4)/w3\}\times100 \qquad \text{Formula (ii)}$$

where w3 and w4 are as described above.

It is presumed that the precursor particles have no communication hole and no shell defect in the shell and are excellent in shell strength when the permeability of the hydrocarbon solvent is 5% or less. When the hollow resin particles having the permeability of the hydrocarbon solvent of 5% or less are produced by a conventional method, a large amount of a hydrocarbon solvent remains in the particles. However, by using the production method of the first present disclosure, it is possible to obtain hollow resin particles having the permeability of the hydrocarbon solvent of 5% or less and having a reduced residual amount of the hydrocarbon solvent.

In each of the production methods of the present disclosure, by using the bifunctional crosslinkable monomer as the crosslinkable monomer included in the polymerizable monomer, a shell having the permeability of the hydrocarbon solvent of 5% or less can be formed.

In the solvent removal step, the temperature $T_0$ of heat-drying at the time of removing the hydrocarbon solvent from the precursor particles is a drying temperature set according to the drying apparatus used. In the present disclosure, a drying apparatus used for heat-drying performed in the solvent removal step may be a direct heating type in which particles are directly heated by hot air or the like, or an indirect heating type in which particles are heated by bringing the particles into contact with a jacket or the like into which a heat medium is injected. The temperature $T_0$ of the heat-drying is basically the temperature inside the drying chamber. However, when the indirect heating type drying apparatus is used, the temperature of the heating medium can be regarded as the temperature inside the drying chamber. Hence, the temperature of the heating medium can be the temperature $T_0$ of the heat-drying.

In the present disclosure, with respect to the boiling point $T_1$ (° C.) of the hydrocarbon solvent included in the precursor particles and the thermal decomposition initiation temperature $T_2$ (° C.) of the precursor particles, the temperature $T_0$ (° C.) of the heat-drying for the removal of the hydrocarbon solvent satisfies $(T_1+70) \leq T_0 \leq (T_2-5)$, and preferably satisfies $(T_1+75) \leq T_0 \leq (T_2-5)$.

In the present disclosure, the thermal decomposition initiation temperature $T_2$ (° C.) of the precursor particles is measured using an analysis software from the heat loss of the precursor particles measured by TG-DTA (thermogravimetric differential thermal analysis) in an air atmosphere. As the TG-DTA apparatus (thermogravimetry-differential thermal analysis simultaneous measuring apparatus), for example, EXSTAR6000 series manufactured by Seiko Instruments Inc. can be used. As the analysis software, an analysis software attached to the apparatus can be used.

TG-DTA curve of the precursor particles is specifically obtained by precisely weighing about 15 mg of precursor particles used in the solvent removal, and measuring the precursor particles under an air atmosphere under the following conditions, using alumina as a reference material.

Air flow rate: 230 mL/min

Temperature increasing rate: 10° C./min

Measurement temperature range: 30° C. to 800° C.

The thermal decomposition initiation temperature of the precursor particles can be determined from the obtained TG-DTA curve using the analysis software. In the present disclosure, the thermal decomposition initiation temperature is determined in accordance with JIS K7120:1987 "Testing Methods of Plastics by Thermogravimetry". When the mass decrease is one-stage mass decrease, the initiation temperature of the mass decrease is determined as the thermal decomposition initiation temperature. When the mass decrease is multi-stage mass decrease, the primary initiation temperature of the mass decrease is determined as the thermal decomposition initiation temperature.

The thermal decomposition initiation temperature $T_2$ (° C.) of the precursor particles used in this step is preferably from 150° C. to 350° C., and more preferably from 200° C. to 300° C., from the viewpoint of obtaining hollow resin particles having excellent heat resistance.

The time of the heat-drying in this step is appropriately set according to the method of heat-drying, and is not particularly limited. The time of the heat-drying is generally from 30 minutes to 1500 minutes, and from the viewpoint of productivity, it is preferably 800 minutes or less, and more preferably 500 minutes or less.

The pressure at the time of heat-drying in this step is preferably from 0 kPa to 101.3 kPa, more preferably from 0 kPa to 71 kPa, and still more preferably from 0 kPa to 10 kPa, from the viewpoint of suppressing breakage of the hollow resin particles.

The drying atmosphere when performing the heat-drying in this step is not particularly limited and can be appropriately selected depending on the application of the hollow resin particles. Examples of the drying atmosphere include air, oxygen, nitrogen, and argon. From the viewpoint of safety and drying efficiency, an inert gas atmosphere such as nitrogen or argon is preferred. The drying atmosphere may be an air atmosphere from the viewpoint of simplicity. By the drying operation in a gaseous atmosphere, the hydrocarbon solvent inside the precursor particles is replaced by an external gas, and as a result, hollow resin particles in which the gas occupies the hollow portion are obtained. When the heat-drying is performed under a vacuum condition, hollow resin particles having a vacuum inside are temporarily obtained. Then, by setting the pressure to normal, hollow resin particles having hollow portions filled with gas can be obtained.

The amount of the precursor particles being heat-dried in this step is appropriately adjusted according to the method of heat-drying, and is not particularly limited. It is generally from 0.1 L to 100 L, and is preferably 10 L or more from the viewpoint of mass production.

As a method of heat-drying in this step, a known method can be employed, and the method is not particularly limited. As the method of heat-drying, examples include, a static drying method in which drying is performed while the precursor particles are left standing, a stirring drying method in which drying is performed while stirring the precursor particles in a gaseous atmosphere, and an air flow drying method. Among them, the stirring drying method is preferred from the viewpoint that the hydrocarbon solvent can be removed from a large amount of precursor particles in a short time and the productivity is excellent.

As the dryer for performing the static drying method, examples include a shelf stage vacuum dryer such as a rectangular vacuum dryer (model number: ADP300) manufactured by Yamato Scientific Co., Ltd.

When a solvent removal step is performed by the static drying method, in general, a cake of the precursor particles is placed in a dryer to be dried. From the viewpoint of removing the hydrocarbon solvent from the precursor particles in a short time, it is preferable that the cake of the precursor particles has a thickness of 1 cm or less. The effective volume of the drying chamber of the dryer for static drying is generally from $0.0001 \, m^3$ to $1 \, m^3$.

The dryer for performing the stirring drying method is not particularly limited as long as it is one that is equipped with a stirring vessel capable of drying a desired material while stirring the material. For example, a stirring dryer that is equipped with a stirring vessel capable of adjusting temperature and internal pressure can be preferably used. By using such a stirring dryer, the precursor particles can be heat-dried while stirred in the stirring vessel. The stirring dryer generally has a larger effective volume than a dryer which performs static drying. The effective volume of the stirring vessel equipped in the stirring dryer is generally from 0.0001 m³ or more. It is preferably 3 m³ or more from the viewpoint of mass production, while, from the viewpoint of productivity, it is generally 20 m³ or less, and may be 15 m³ or less.

Examples of the type of the stirring dryer include a direct heating type such as a fluidized bed drying apparatus, and an indirect heating type in which a jacket for flowing a heat medium is provided on an outer periphery of a stirring vessel.

Examples of the stirring dryer include a vertical stirring dryer used in the manufacturing method of the second present disclosure described later, and a horizontal stirring dryer used in the manufacturing method of the third present disclosure described later.

The vertical stirring dryer is preferable in that the yield of the hollow resin particles can be improved, while the horizontal stirring dryer is preferable in that heat transfer efficiency is excellent, the time of the heat-drying in the solvent removal step can be shortened and the productivity is excellent. Further, in the horizontal stirring dryer, the ratio (heat transfer area/effective volume) of the heat transfer area to the effective volume is easily increased as compared with the vertical stirring dryer. Accordingly, by using the horizontal stirring dryer, the drying efficiency is easily improved and the productivity is easily improved.

In the stirring-drying performed in the production method of the first present disclosure, from the viewpoint of suppressing breakage of the precursor particles or the hollow resin particles, the stirring blade tip speed calculated by the following formula (iii) is preferably 2.0 m/s or less, more preferably 1.5 m/s or less, still more preferably 0.8 m/s or less, and even more preferably 0.6 m/s or less. From the viewpoint of improving productivity, the stirring blade tip speed is preferably 0.1 m/s or more, and more preferably 0.3 m/s or more.

$$\text{Stirring blade tip speed (m/s)} = \text{Circumferential ratio} \times$$
$$\text{Stirring blade diameter (m)} \times \text{Revolution (s}^{-1}) \quad \text{Formula (iii)}$$

The stirring blade diameter is a value obtained by doubling the maximum value of the linear distance from the central axis of the shaft to the tip of the stirring blade in the stirring blade observed from the central axis direction of the shaft.

In the stirring-drying performed by the production method of the first present disclosure, from the viewpoint of suppressing breakage of the precursor particles or the hollow resin particles, the rotation speed of the stirring blade is preferably 70 rpm or less, more preferably 40 rpm or less, and still more preferably 30 rpm or less. From the viewpoint of improving productivity, it is preferably 5 rpm or more, and more preferably 10 rpm or more.

When the heat-drying in this step is performed by stirring-drying, it is preferable that this step is performed by heat-drying and stirring simultaneously the precursor particles separated from the aqueous medium in combination with at least one kind of fine particles selected from the group consisting of inorganic fine particles and organic fine particles in a stirring vessel to coat a surface of the precursor particles with the fine particles and remove the hydrocarbon solvent from the precursor particles. By coating the surface of the precursor particles with the fine particles, flowability at the time of stirring of the precursor particles is improved. Accordingly, the drying efficiency of stirring-drying is improved, and as a result, productivity of the hollow resin particles is improved.

The fine particles coating the surface of the precursor particles are at least one kind of fine particles selected from the group consisting of inorganic fine particles and organic fine particles.

Examples of the material of the inorganic fine particles include silica, calcium carbonate, alumina, titanium oxide, zinc oxide, tin oxide, calcium phosphate, cerium oxide, and the like. Among these, silica, calcium carbonate and alumina are preferred, and silica and calcium carbonate are more preferred as the material of the inorganic fine particles.

Examples of the material of the organic fine particles include styrene-based resin, acrylic resin, polyamide resin, styrene acrylic resin, polylactic acid resin, silicone resin, fluorine resin, melamine-formaldehyde condensate, benzo-guanamine-formaldehyde condensate, urethane resin, epoxy resin, polyester resin, wax, and the like. These materials may be subjected to crosslinking treatment or surface treatment or the like. It is preferable that the organic fine particles have a heat-resistant temperature equal to or higher than a temperature of heat-drying in the solvent removal.

These inorganic fine particles and organic fine particles may be used alone or in combination of two or more thereof.

Among them, as the fine particles for coating the surface of the precursor particles, inorganic tine particles are preferred from the viewpoint that the effect of improving flowability at the time of stirring the precursor particles is excellent.

The primary average particle diameter of the fine particles coating the surface of the precursor particles is generally from 10 nm to 120 nm, preferably from 15 nm to 90 nm, and more preferably from 20 nm to 80 nm. When the average primary particle diameter of the fine particles is equal to or larger than the lower limit value, the fine particles are likely to function as a spacer for suppressing contact between the precursor particles. When the average primary particle diameter of the fine particles is equal to or lower than the upper limit value, since the fine particles are likely to uniformly coat the precursor particles, the flowability of the precursor particles can be improved and drying efficiency can be improved.

The specific gravity of the fine particles coating the surface of the precursor particles is not particularly limited. It is preferably from 1.5 to 4.5, more preferably from 1.8 to 3.5, and still more preferably from 2.0 to 2.5. When the specific gravity of the fine particles is within the above range, it is possible to achieve both dispersibility of the precursor particles and weight reduction of the hollow resin particles to be obtained.

Examples of the material of the inorganic fine particles having the specific gravity of 2.0 or more and 2.5 or less include silica. Examples of the material of the inorganic fine particles having the specific gravity of more than 2.5 and 3.5 or less include calcium carbonate. Examples of the material of the inorganic fine particles having a specific gravity of more than 3.5 include titanium oxide and alumina.

The content of the fine particles coating the surface of the precursor particles is preferably adjusted such that the fine particle coverage in the obtained hollow resin particles falls within a preferable range described later, and is not particularly limited. The content of the fine particles is generally from 0.1 parts by mass to 180 parts by mass, preferably from 1 part by mass to 100 parts by mass, and more preferably from 2 parts by mass to 50 parts by mass, with respect to 100 parts by mass of the precursor particles used in the solvent removal. When the content of the fine particles is equal to or larger than the lower limit value, drying efficiency and productivity can be sufficiently improved. When the content is equal to or lower than the upper limit value, an increase in specific gravity of the obtained hollow resin particles can be suppressed.

(6) Other Steps

The production method of the first present disclosure may further include other steps different from the steps (1) to (5) mentioned above. As the other steps, examples include a washing step, and a re-substitution step of the hollow portion.

When a sparingly water-soluble inorganic compound is used as the suspension stabilizer, the washing step is a step of removing the sparingly water-soluble inorganic compound contained in the precursor composition. The washing step is generally performed after the polymerization step and before the solid-liquid separation step.

As the method of the washing step, for example, a method of adding an acid to the precursor composition and adjusting the pH to preferably 6.5 or less, and more preferably 6 or less, is preferred. As the added acid, an inorganic acid such as sulfuric acid, hydrochloric acid and nitric acid, or an organic acid such as formic acid and acetic acid may be used. Of them, sulfuric acid is particularly preferred due to its high removal efficiency of the sparingly-water soluble inorganic compound and small influence on production equipment.

The re-substitution step of the hollow portion is a step of substituting the gas in the interior of the hollow resin particles with another gas or liquid. By such substitution, the environment of the interior of the hollow resin particles can be changed; molecules can be selectively confined in the interior of the hollow resin particles; or the chemical structure of the interior of the hollow resin particles can be modified in accordance with the intended application thereof. In the production method of the first present disclosure, hollow resin particles in which the hollow portion is filled with a gas such as air is obtained by the solvent removal step. However, the hollow resin particles may become hollow resin particles including a solvent other than the hydrocarbon solvent in the hollow portion by performing the re-substitution step of the hollow portion thereafter.

I-2. Hollow Resin Particles

The shape of the hollow resin particles obtained by the production method of the first present disclosure is not particularly limited, as long as the hollow portion is formed in the interior. The external shape of the hollow resin particles is not particularly limited, and it is preferably spherical shape in terms of ease of production.

The hollow resin particles obtained by the production method of the first present disclosure may have one or two or more hollow portions. As the hollow resin particles, those having only one hollow portion are preferred from the viewpoint of maintaining a good balance between the high void ratio and mechanical strength of the hollow resin particles. The shell of the hollow resin particles and, when the hollow resin particles have two or more hollow portions, a partition separating the adjacent hollow portions from each other may be porous.

The average circularity of the hollow resin particles obtained by the production method of the first present disclosure may be from 0.950 to 0.995.

An example of the image of the shape of the hollow resin particles obtained by the production method of the first present disclosure is a bag made of a thin film and inflated with gas. The cross-section thereof is as shown by the hollow resin particle 100 in the diagram (5) of FIG. 1. In this example, one thin film is provided on the outside, and the interior is filled with gas.

The external shape of the hollow resin particles can be confirmed by, for example, observing the particles with a SEM or a TEM. The internal shape of the hollow resin particles can be confirmed by, for example, SEM observation of the cross section of the particles or TEM observation of the particles.

The volume average particle diameter of the hollow resin particles obtained by the production method of the first present disclosure is not particularly limited. It is preferably from 1.0 μm to 100.0 μm, more preferably from 2.0 μm to 30.0 μm, and still more preferably from 3.2 μm to 9.0 μm.

When the volume average particle diameter of the hollow resin particles is equal to or larger than the lower limit value, aggregation of the hollow resin particles is suppressed, and the productivity is improved. When the volume average particle diameter is equal to or lower than the upper limit value, the hollow resin particles hardly collapse, and they have high mechanical strength.

The particle size distribution (volume average particle diameter (Dv)/number average particle diameter (Dn)) of the hollow resin particles obtained by the production method of the first present disclosure may be, for example, from 1.1 to 2.5. When the particle size distribution is equal to or lower than the upper limit value, particles which have small variation in compressive strength characteristics and heat resistance between the particles, can be obtained. When the particle size distribution is equal to or lower than the upper limit value, for example, a product having a uniform thickness can be produced in the case of producing a molded body in a sheet form.

The volume average particle diameter (Dv) and number average particle diameter (Dn) of the hollow resin particle can be found as follows, for example. The particle diameter of each of the hollow resin particles is measured with a laser diffraction particle size distribution measuring apparatus; the number average and volume average of the particle diameters are calculated; and the obtained values can be used as the number average particle diameter (Dn) and volume average particle diameter (Dv) of the particles. The particle size distribution is found by dividing the volume average particle diameter by the number average particle diameter.

The void ratio of the hollow resin particles obtained by the production method of the first present disclosure is preferably from 50% to 95%, more preferably from 55% to 90%, and still more preferably from 60% to 85%. When the void ratio is equal to or higher than the lower limit value, the hollow resin particles are excellent in light weight, heat resistance and heat insulating property, and the hydrocarbon solvent hardly remains inside the particles. When the void ratio is equal to or lower than the upper limit value, a communication hole and a shell defect are hardly formed in the shell of the hollow resin particles, and the hollow resin particles hardly collapse and have excellent strength.

The void ratio of the hollow resin particles obtained by the production method of the first present disclosure is calculated from the apparent density $D_1$ and the true density $D_0$ of the hollow resin particles. When the hydrocarbon solvent remains in the hollow resin particles, the larger the residual amount of the hydrocarbon solvent, the smaller the void ratio of the hollow resin particles determined by the following method. On the other hand, the theoretical void ratio to be described later is a void ratio when it is assumed that no hydrocarbon solvent remains in the hollow resin particles, and represents a ratio occupied by the hollow portion with respect to the specific gravity of the hollow resin particles.

A method for measuring the apparent density $D_1$ of the hollow resin particles is as follows. First, approximately 30 cm$^3$ of the hollow resin particles are added into a measuring flask with a volume of 100 cm$^3$, and the mass of the added hollow resin particles is precisely weighed. Next, the measuring flask in which the hollow resin particles are added, is precisely filled with isopropanol up to the marked line while preventing air bubbles from getting in. The mass of the isopropanol added to the measuring flask is precisely weighed, and the apparent density $D_1$ (g/cm$^3$) of the hollow resin particles is calculated by the following formula (I).

> Apparent density $D_1$=[Mass of the hollow resin particles]/(100−[Mass of the isopropanol]/[Specific gravity of the isopropanol at the measuring temperature])   Formula (I)

The apparent density $D_1$ is equivalent to the specific gravity of the whole hollow resin particle in the case where the hollow portion is regarded as a part of the hollow resin particle.

A method for measuring the true density $D_0$ of the hollow resin particles is as follows. The hollow resin particles are pulverized in advance; approximately 10 g of the pulverized hollow resin particles are added into a measuring flask with a volume of 100 cm$^3$; and the mass of the added pulverized particles is precisely weighed. After that, similarly to the measurement of the apparent density mentioned above, isopropanol is added to the measuring flask; the mass of the isopropanol is precisely weighed; and the true density $D_0$ (g/cm$^3$) of the hollow resin particles is calculated by the following formula (II).

> True density $D_0$=[Mass of the pulverized hollow resin particles]/(100−[Mass of the isopropanol]/[Specific gravity of the isopropanol at the measuring temperature])   Formula (II)

The true density $D_0$ is equivalent to the specific gravity of the shell portion alone of the hollow resin particle. As is clear from the measurement method mentioned above, when calculating the true density $D_0$, the hollow portion is not regarded as a part of the hollow resin particle.

The void ratio (%) of the hollow resin particles is calculated by the following formula (III) from the apparent density $D_1$ and true density $D_0$ of the hollow resin particles.

> Void ratio (%)=100−(Apparent density $D_1$/True density $D_0$)×100   Formula (III)

The void ratio of the hollow resin particles thus obtained may be referred to as an actual measured void ratio, distinguishing it from a theoretical void ratio described later.

The theoretical void ratio of the hollow resin particles obtained by the production method of the first present disclosure can be determined from the added amount Ws of the hydrocarbon solvent and the specific gravity Gs of the hydrocarbon solvent in the mixture liquid preparation step, and the added amount Wr of the raw material of the solid content constituting the hollow resin particles and the true density $D_0$ of the hollow resin particles by the following formula (IV).

> Theoretical void ratio (%)=(Ws/Gs)/{(Ws/Gs)+(Wr/D$_0$)}×100   Formula (IV)

where Ws, Gs, Wr and $D_0$ are as described above.

The raw material of the solid content constituting the hollow resin particles include the polymerizable monomer, and may include the polar resin and the fine particles which are added if necessary, and does not include a material such as the polymerization initiator which is decomposed and does not constitute hollow resin particles. In the present disclosure, a "solid content" is all components other than solvents. For example, liquid monomers and those dissolved in a solvent are included in the solid content.

The true density $D_0$ of the hollow resin particles in the formula (IV) is the true density $D_0$ obtained by the above-mentioned formula (II).

In the hollow resin particles obtained by the production method of the first present disclosure, the hydrocarbon solvent residual rate calculated by the following formula (V) from the theoretical void ratio and actual measured void ratio of the hollow resin particles described above is preferably 0.5% or less, more preferably 0.3% or less, and still more preferably 0.2% or less.

> Hydrocarbon solvent residual rate (%)=100−(Actual measured void ratio/Theoretical void ratio)×100   Formula (V)

When the hydrocarbon solvent residual rate is equal to or lower than the above upper limit value, there is no fear that the hydrocarbon solvent in the hollow resin particles volatilizes or foams or causes ignition when the hollow resin particles are kneaded with other materials, and the specific gravity of the hollow resin particles can be reduced, and the efficacy as a weight reducing material can be improved.

The hollow resin particles obtained by the production method of the first present disclosure may have a shell thickness of from 0.01 µm to 5.00 µm, and preferably from 0.10 µm to 1.00 µm. As a result, it is possible to suppress a decrease in mechanical strength of the hollow resin particles while maintaining the void ratio of them.

The shell thickness of the hollow resin particles can be calculated as follows. The inner diameter r is calculated by the following formula (1) from the volume average particle diameter $R_1$ and theoretical void ratio of the hollow resin particles, and the shell thickness is calculated by the following formula (2) from the inner diameter r and the volume average particle diameter $R_1$.

> $4/3\pi \times (R_1/2)^3 \times$ Theoretical void ratio$=4/3\pi \times (r/2)^3$   Formula (1)

> Shell thickness$=(R_1-r)/2$   Formula (2)

The difference between the shell thickness calculated as described above and the average value of the actually measured thicknesses of 20 points of the shell, is generally within ±10% of the average value of them. Accordingly, the shell thickness calculated as described above can be considered as the shell thickness of the hollow resin particle.

The thickness of each point of the shell of the hollow resin particle, which is used to obtain the average value of the thicknesses of 20 points of the shell, can be measured, for example, by SEM observation of shell fragments obtained by breaking the hollow resin particle.

Further, according to the production method of the first present disclosure, the hollow resin particles which have the water content of less than 1% can be obtained. When the water content of the hollow resin particles is less than 1%, the hollow resin particles can be further reduced in weight.

In addition, when the surface of the hollow resin particles obtained by the production method of the first present disclosure is coated with the fine particles, the hollow resin particles may have a fine particle coverage determined by the following formula (A) of from 60% to 180%. From the viewpoint of productivity, the fine particle coverage is preferably 65% or more, while it is preferably 175% or less, more preferably 170% or less, and still more preferably 160% or less, from the viewpoint of weight reduction.

The fine particle coverage with respect to the surface area of the hollow resin particles is calculated from the volume average particle diameter $R_2$ (nm) of the hollow resin particles which are assumed not to contain the fine particles, the apparent density S (g/cm³) of the hollow resin particles which are assumed not to contain the fine particles or the hydrocarbon solvent, the average primary particle diameter d (nm) of the fine particles, the specific gravity s of the fine particles, and the added amount n (part by mass) of the fine particles as shown in the following formula (A). The added amount n (parts by mass) of the fine particles is an added amount of the fine particles with respect to 100 parts by mass of the hollow resin particles assumed not to contain the fine particles or the hydrocarbon solvent.

$$\text{Fine particle coverage } (\%) = \{3^{1/2}/2\pi\} \times \{(R_2 \times S)/(d \times s)\} \times n \qquad \text{Formula (A)}$$

where $R_2$, S, d, s and n are as described above.

The volume average particle diameter ($R_2$) of the hollow resin particles assumed not to contain the fine particles can be regarded as the same as the volume average particle diameter of the precursor particles. The apparent density (S) of the hollow resin particles assuming not to contain fine particles or the hydrocarbon solvent can be regarded as the same as the apparent density of the particles obtained by subjecting the precursor particles to static drying at 230° C. for 24 hours. The apparent density of the particles obtained by drying the precursor particles at 230° C. for 24 hours can be measured in the same manner as the apparent density $D_1$ of the hollow resin particles.

According to the production method of the first present disclosure, the value (kg/(h·m³)) calculated by dividing the weight (kg) of the obtained hollow resin particles by the heat-drying time (h) performed in the solvent removal step, and further dividing the obtained value by the effective volume (m³) of the dryer, can be, for example, 0.01 or more, preferably 3 or more, more preferably 30 or more, and still more preferably 100 or more. The larger the value (kg/(h-m³)) is, the larger amount of the hollow resin particles can be produced in a short time, and the productivity is excellent.

I-3. Applications of Hollow Resin Particles

Examples of the intended application of the hollow resin particles obtained by the production method of the first present disclosure include an under-coating material of thermal paper. In general, an under-coating material is required to have heat insulation properties and shock-absorbing properties (cushioning properties). In addition, it is required to have heat resistance in line with thermal paper uses. The hollow resin particles obtained by the production method of the first present disclosure are also useful as, for example, a plastic pigment that is excellent in gloss, hiding power, etc.

Further, since the hollow resin particles obtained by the production method of the first present disclosure have excellent strength, the hollow resin particles are hardly collapse when mixed and kneaded with other materials such as a resin. Accordingly, the hollow resin particles exert excellent effects as a weight reducing material, a heat insulation material, an acoustic insulation material, a damping material and so on, when they are added to a molded body. Thus, they are suitably used as an additive for a molded body, and particularly suitably for a molded body made of resin.

A useful component such as a perfume, a medicine, an agricultural chemical and an ink component can be enclosed in the interior of the hollow resin particles obtained by the production method of the first present disclosure by a means such as immersion treatment or depressurized or pressurized immersion treatment. The hollow resin particles in which such a useful component is enclosed, can be used for various applications in accordance with the component contained in the interior.

II-1. Method of the Second Present Disclosure for Producing Hollow Resin Particles In a conventional production method for obtaining hollow resin particles by polymerizing a polymerizable monomer in an aqueous medium by a suspension polymerization method, as described above, when the content ratio of a crosslinkable monomer is increased in the polymerizable monomer forming the shell of the hollow resin particles in order to increase the strength of the shell, there is a problem that a large amount of an organic solvent remains inside the hollow resin particles even when the hollow resin particles are dried. In addition, the conventional production method also has a problem that it is difficult to dry and remove the organic solvent in a short time against a large amount of particles when drying and removing the organic solvent remaining inside the particles, and that it is difficult to improve productivity.

An object of the second present disclosure is to provide a method for producing hollow resin particles, which is excellent in productivity and can obtain hollow resin particles in which a residual amount of a hydrocarbon solvent once held inside particles in a production process is reduced and particle breakage is suppressed.

The method of the second present disclosure for producing hollow resin particles is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, and removing the hydrocarbon solvent from the precursor particles, wherein the polymerizable monomer contains a crosslinkable monomer in an amount of from 40% by mass to 100% by mass, and wherein the removal of the hydrocarbon solvent from the precursor particles is performed by heat-drying and stirring simultaneously the precursor particles in a vertical stirring vessel equipped with a shaft extending in a gravity direction and stirring blades.

According to the production method of the second present disclosure, the hollow resin particles in which a residual amount of a hydrocarbon solvent once held inside particles in a production process is reduced and particle breakage is suppressed, can be efficiently produced.

The production method of the second present disclosure is in accordance with the same basic technique as the production method of the first present disclosure described above. In the production method of the second present disclosure, the precursor particles including the hydrocarbon solvent are heat-dried while being stirred in a vertical stirring vessel, whereby the hydrocarbon solvent can be sufficiently removed in a short time while suppressing breakage of the particles, and thus the productivity of the hollow resin particles is excellent.

In the second production method of the present disclosure, by using the vertical stirring method as the stirring method, the yield of the hollow resin particles can be increased as compared with the case of using the horizontal stirring method or the like.

According to the production method of the second present disclosure, the effect of reducing the residual amount of the hydrocarbon solvent in the hollow resin particles is particularly effectively exhibited when the hollow resin particles comprising a shell having no communication hole and no shell defect are produced. For example, hollow resin particles comprising a shell having no communication hole and no shell defect can be produced in the same way as production method of the first present disclosure, which is the way of using the bifunctional crosslinkable monomer as the crosslinkable monomer included in the polymerizable monomer forming the shell.

As an example of the production method of the second present disclosure, there is a method including (1) a mixture liquid preparation step, (2) a suspension step, (3) a polymerization step, (4) a solid-liquid separation step and (5) a solvent removal step.

Among the steps (1) to (5) above, the production method of the second disclosure includes at least the mixture liquid preparation step, the suspension step, the polymerization step and the solvent removal step. It is preferable that the production method of the second disclosure further includes the solid-liquid separation step, since the hydrocarbon solvent included in the hollow resin particles can be easily removed and productivity can be improved.

Each of the steps (1) to (4) is the same as each of the steps (1) to (4) in the above-mentioned production method of the first present disclosure. FIG. 1 is also a diagram illustrating an example of the production method of the second present disclosure, and FIG. 2 is also a schematic diagram showing an embodiment of a suspension used in the production method of the second present disclosure.

Hereinafter, the solvent removal step of the production method of the second present disclosure will be described.

The solvent removal step in the production method of the second present disclosure includes heat-drying the precursor particles to remove the hydrocarbon solvent from the precursor particles.

This step is preferably a step performed after the solid-liquid separation step, and is preferably performed using precursor particles separated from the aqueous medium.

In this step, the hollow resin particles filled with gas are obtained by heat-drying the precursor particles in a gaseous atmosphere and replacing the hydrocarbon solvent in the interior of the precursor particles with a gas. The term "in a gaseous atmosphere" is as described in the production method of the first present disclosure described above.

In the production method of the second present disclosure, the water content of the precursor particles used in the solvent removal step and the permeability of the hydrocarbon solvent are the same as those of the production method of the first present disclosure described above.

In the solvent removal step of the production method of the second present disclosure, the precursor particles are heat-dried while being stirred in a vertical stirring vessel equipped with a shaft extending in the gravity direction and stirring blades. Examples of the vertical stirring dryer used for such heat-drying include those of the direct heating type and those of the indirect heating type. Among these, a vertical stirring dryer of the indirect heating type is preferred.

The stirring blades are preferably fixed to the shaft. The stirring blades may be spiral ribbon type, screw type, paddle type, or full-zone type. They are not particularly limited. The stirring blades and the shaft may be heat transfer stirring blades and a heat transfer shaft which allow the heat medium to flow inside.

The shape of the stirring vessel equipped in the vertical stirring dryer used in the second production method of the present disclosure is preferably cylindrical or conical. The conical stirring vessel is generally installed such that the direction from the bottom surface of the cone to the apex is the direction of the gravity.

The stirring vessel equipped in the vertical stirring dryer has a ratio (b/a), which is the ratio of the maximum value b of the distance in a direction perpendicular to the shaft inside the stirring vessel to the length of the shaft inside the stirring vessel, of generally from 0.5 to 2.0. The ratio (b/a) is preferably 0.9 or less, and more preferably 0.8 or less, since the heat transfer rate is improved and the stirring efficiency is improved. On the other hand, when the installation space is limited, the ratio (b/a) is preferably 1.0 or more from the viewpoint of increasing the effective volume of the stirring vessel and improving the productivity.

Figure 3:
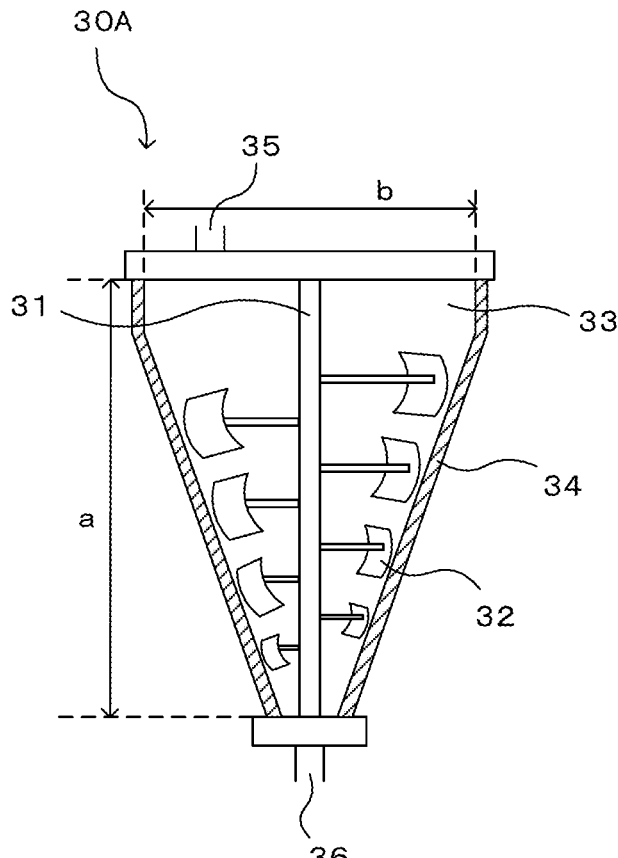
FIG. 3 is a schematic sectional view showing an example of a vertical stirring dryer used in the production method of the second present disclosure.
Figure 4:
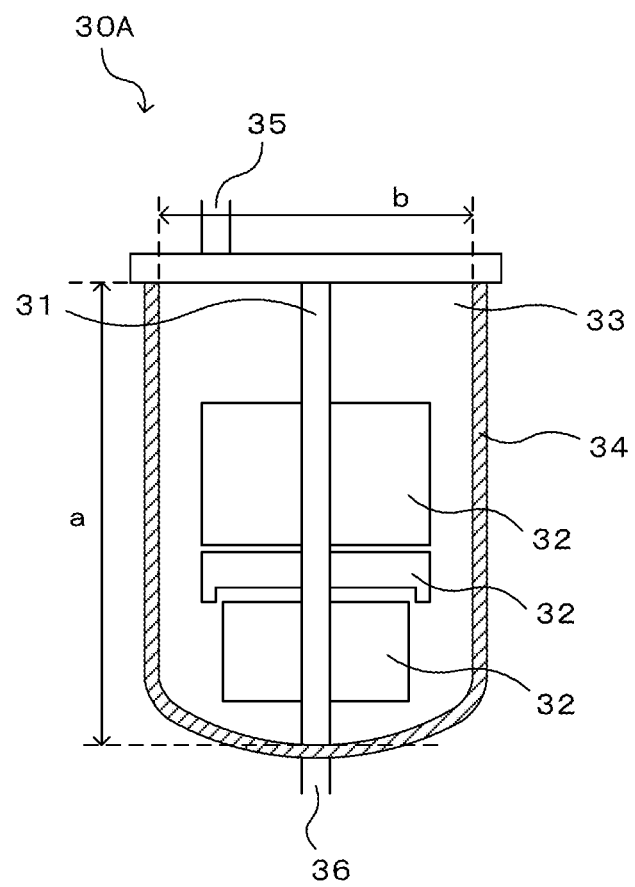
FIG. 4 is a schematic sectional view showing another example of a vertical stirring dryer used in the production method of the second present disclosure.

FIG. 3 is a schematic sectional view showing an example of a vertical stirring dryer used in the production method of the second present disclosure, and FIG. 4 is a schematic sectional view showing another example of a vertical stirring dryer used in the production method of the second present disclosure. Each vertical stirring dryer 30A shown in FIG. 3 and FIG. 4 has a vertical stirring vessel 33 having a shaft 31 extending in the gravity direction and stirring blades 32 fixed to the shaft 31. In the vertical stirring dryer 30A, a jacket 34 capable of flowing a heat medium covers the outer periphery of the stirring vessel 33. In the vertical stirring dryer 30A shown in FIG. 3, the shape of the stirring vessel is conical, and the stirring blades are paddle type. In the vertical stirring dryer 30A shown in FIG. 4, the shape of the stirring vessel is cylindrical, and the stirring blades are full-zone type. In each of the stirring dryer 30A shown in FIG. 3 and FIG. 4, the precursor particles supplied from the supply port 35 are stirred and dried in the stirring vessel 33 to be discharged from the discharge port 36 as hollow resin particles from which the hydrocarbon solvent has been removed.

The vertical stirring dryer may have a gearbox. When the heat-resistant temperature of the gearbox is equal to or higher than the temperature of the heat medium, the installation position of the gearbox is not particularly limited. When the heat-resistant temperature of the gearbox is lower than the temperature of the heat medium, it is preferable that the gearbox is installed at a position not exposed to the heat medium. For example, it is preferable that the gearbox is installed outside the jacket.

Examples of commercially available vertical stirring dryers which are preferably used include the product name "RIBOCONE", manufactured by Okawara MFG. Co., Ltd., the product name "PV MIXER", manufactured by Kobelco Eco-Solutions Co., Ltd., and the like. "RIBOCONE is a dryer that performs drying in a vertical conical stirring vessel and has spiral ribbon-type stirring blades fixed to the shaft. "PV MIXER" is a dryer that performs drying in a vertical conical stirring vessel and has paddle-type stirring blades fixed to the shaft.

In the solvent removal step, the temperature $T_0$ of the heat-drying at the time of removing the hydrocarbon solvent from the precursor particles is a drying temperature set according to the drying apparatus to be used, and is the same as that of the above-mentioned production method of the first present disclosure. In the production method of the second present disclosure, the temperature $T_0$ of heat-drying in the solvent removal step preferably satisfies $T_1 \leq T_0 \leq (T_2-5)$, more preferably satisfies $(T_1+70) \leq T_0 \leq (T_2-5)$, and still more preferably satisfies $(T_1+140) \leq T_0 \leq (T_2-5)$, with respect to the boiling point $T_1$ (° C.) of the hydrocarbon solvent and the thermal decomposition initiation temperature $T_2$ (° C.) of the precursor particles.

The time of the heat-drying in this step is preferably from 80 minutes to 210 minutes, and more preferably from 80 minutes to 160 minutes, from the viewpoint of productivity.

In the production method of the second present disclosure, the thermal decomposition initiation temperature $T_2$ (° C.) of the precursor particles used in the solvent removal step, the pressure at the time of the heat-drying in the solvent removal step, the drying atmosphere when performing the heat-drying, and the amount of the precursor particles being heat-dried are the same as those of the above-mentioned production method of the first present disclosure.

The effective volume of the stirring vessel equipped in the vertical stirring dryer used in the production method of the second present disclosure is generally from 0.0001 $m^3$ or more. It is preferably 3 $m^3$ or more from the viewpoint of mass production, while, from the viewpoint of productivity, it is generally 20 $m^3$ or less, and may be 15 $m^3$ or less.

In the stirring-drying performed in the production method of the second present disclosure, from the viewpoint of suppressing breakage of the precursor particles or the hollow resin particles, the stirring blade tip speed calculated by the formula (iii) explained in the production method of the first present disclosure is preferably 2.0 m/s or less, more preferably 1.5 m/s or less, still more preferably 0.8 m/s or less, and even more preferably 0.6 m/s or less. From the viewpoint of improving productivity, the stirring blade tip speed is preferably 0.1 m/s or more, and more preferably 0.3 m/s or more.

In the stirring-drying performed by the production method of the second present disclosure, from the viewpoint of suppressing breakage of the precursor particles or the hollow resin particles, the rotation speed of the stirring blade is preferably 70 rpm or less, more preferably 40 rpm or less, and still more preferably 30 rpm or less. From the viewpoint of improving productivity, it is preferably 5 rpm or more, and more preferably 10 rpm or more.

In the production method of the second present disclosure, it is preferable that the solvent removal step is performed by heat-drying and stirring simultaneously the precursor particles in combination with at least one kind of fine particles selected from the group consisting of inorganic fine particles and organic fine particles in a stirring vessel to coat a surface of the precursor particles with the fine particles and remove the hydrocarbon solvent from the precursor particles, as in the case of performing stirring-drying in the production method of the first present disclosure described above.

Examples of the fine particles for coating the surface of the precursor particles include those used in the production method of the first present disclosure described above. The fine particles preferred in the production method of the first present disclosure can be similarly preferably used in the production method of the second present disclosure. Also, a preferable content of the fine particles is the same as that of the production method of the first present disclosure.

The production method of the second disclosure may further include other steps different from the steps (1) to (5). Examples of the other steps include the same steps as the other steps that the production method of the first present disclosure may include.

II-2. Hollow Resin Particles

In the hollow resin particles obtained by the production method of the second present disclosure, the shape, the volume average particle diameter, the particle size distribution, the void ratio, the hydrocarbon solvent residual rate, the shell thickness, the water content, and the fine particle coverage are the same as those of the hollow resin particles obtained by the production method of the first present disclosure described above.

On the other hand, according to the production method of the second present disclosure, the value $(kg/(h \cdot m^3))$ calculated by dividing the weight (kg) of the obtained hollow resin particles by the heat-drying time (h) performed in the solvent removal step, and further dividing the obtained value by the effective volume $(m^3)$ of the dryer, can be preferably 15 or more, more preferably 30 or more, and still more preferably 50 or more.

II-3. Applications of Hollow Resin Particles

The applications of the hollow resin particles obtained by the production method of the second present disclosure is, for example, the same as the applications of the hollow resin particles obtained by the production method of the first present disclosure described above. Suitable applications in the hollow resin particles obtained by the production method of the first present disclosure are likewise suitable in the hollow resin particles obtained by the production method of the second present disclosure.

III-1. Method of the Third Present Disclosure for Producing Hollow Resin Particles An object of the third present disclosure is the same as that of the second present disclosure, and it is to provide a method for producing hollow resin particles, which is excellent in productivity and can obtain hollow resin particles in which a residual amount of a hydrocarbon solvent once held inside particles in a production process is reduced and particle breakage is suppressed.

The method of the third present disclosure for producing hollow resin particles is a method comprising:

preparing a mixture liquid containing a polymerizable monomer, a hydrocarbon solvent, a polymerization initiator and an aqueous medium, suspending the mixture liquid to prepare a suspension in which droplets of a polymerizable monomer composition containing the polymerizable monomer, the hydrocarbon solvent and the polymerization initiator are dispersed in the aqueous medium, subjecting the suspension to a polymerization reaction to prepare a precursor composition containing precursor particles having a hollow portion and including the hydrocarbon solvent in the hollow portion, and removing the hydrocarbon solvent from the precursor particles, wherein the polymerizable monomer contains a crosslinkable monomer in an amount of from 40% by mass to 100% by mass, and wherein the removal of the hydrocarbon solvent from the precursor particles is performed by heat-drying and stirring simultaneously the precursor particles in a horizontal stirring vessel equipped with a shaft extending in a horizontal direction and stirring blades.

According to the production method of the third present disclosure, the hollow resin particles in which a residual amount of a hydrocarbon solvent once held inside particles in a production process is reduced and particle breakage is suppressed, can be efficiently produced.

The production method of the third present disclosure is in accordance with the same basic technique as the production method of the first present disclosure described above. In the production method of the third present disclosure, the precursor particles including the hydrocarbon solvent are heat-dried while being stirred in a horizontal stirring vessel, whereby the hydrocarbon solvent can be sufficiently removed in a short time while suppressing breakage of the particles, and thus the productivity of the hollow resin particles is excellent.

In the horizontal stirring method, since the ratio (heat transfer area/effective volume) of the heat transfer area to the effective volume of the stirring vessel is large and the heat transfer efficiency is excellent, the drying removal efficiency of the hydrocarbon solvent is excellent even in the case of the precursor particles having a strong shell, and the productivity is excellent.

According to the production method of the third present disclosure, the effect of reducing the residual amount of the hydrocarbon solvent in the hollow resin particles is particularly effectively exhibited when the hollow resin particles comprising a shell having no communication hole and no shell defect are produced. For example, hollow resin particles comprising a shell having no communication hole and no shell defect are produced in the same way as production method of the first present disclosure, which is the way of using the bifunctional crosslinkable monomer as the crosslinkable monomer included in the polymerizable monomer forming the shell.

As an example of the production method of the third present disclosure, there is a method including (1) a mixture liquid preparation step, (2) a suspension step, (3) a polymerization step, (4) a solid-liquid separation step and (5) a solvent removal step.

Among the steps (1) to (5) above, the production method of the third disclosure includes at least the mixture liquid preparation step, the suspension step, the polymerization step and the solvent removal step. It is preferable that the production method of the third disclosure further includes the solid-liquid separation step, since the hydrocarbon solvent included in the hollow resin particles can be easily removed and productivity can be improved.

Each of the steps (1) to (4) is the same as each of the steps (1) to (4) in the above-mentioned production method of the first present disclosure. FIG. 1 is also a diagram illustrating an example of the production method of the third present disclosure, and FIG. 2 is also a schematic diagram showing an embodiment of a suspension used in the production method of the third present disclosure.

Hereinafter, the solvent removal step of the production method of the third present disclosure will be described.

The solvent removal step in the production method of the third present disclosure includes heat-drying the precursor particles to remove the hydrocarbon solvent from the precursor particles.

This step is preferably a step performed after the solid-liquid separation step, and is preferably performed using precursor particles separated from the aqueous medium.

In this step, the hollow resin particles filled with gas are obtained by heat-drying the precursor particles in a gaseous atmosphere and replacing the hydrocarbon solvent in the interior of the precursor particles with a gas. The term "in a gaseous atmosphere" is as described in the production method of the first present disclosure described above.

In the production method of the third present disclosure, the water content of the precursor particles used in the solvent removal step and the permeability of the hydrocarbon solvent are the same as those of the production method of the first present disclosure described above.

In the solvent removal step of the production method of the third present disclosure, the precursor particles are heat-dried while being stirred in a horizontal stirring vessel equipped with a shaft extending in the horizontal direction and stirring blades. Examples of the horizontal stirring dryer used for such heat-drying include those of the direct heating type and those of the indirect heating type. Among these, a horizontal stirring dryer of the indirect heating type is preferred.

The stirring blades are preferably fixed to the shaft. The stirring blades may be spiral ribbon type, screw type, paddle type, or full-zone type. They are not particularly limited. The stirring blades and the shaft may be heat transfer stirring blades and a heat transfer shaft which allow the heat medium to flow inside. By using at least one of the heat transfer stirring blades and the heat transfer shaft, the heat transfer efficiency is improved. Accordingly, the drying removal efficiency of the hydrocarbon solvent is improved and the productivity of the hollow resin particles can be improved.

The shape of the stirring vessel equipped in the horizontal stirring dryer used in the third production method of the present disclosure may be, for example, cylindrical, conical, spherical, quadrangular prism, or the like.

The stirring vessel equipped in the horizontal stirring dryer has a ratio (b/a), which is the ratio of the maximum value b of the distance in a direction perpendicular to the shaft inside the stirring vessel to the length of the shaft inside the stirring vessel, of generally from 0.2 to 1.5. The ratio is preferably 0.5 or less, since the heat transfer rate is improved and the stirring efficiency is improved. On the other hand, when the installation space is limited, the ratio (b/a) is preferably 0.6 or more from the viewpoint of increasing the effective volume of the stirring vessel and improving the productivity.

The horizontal stirring dryer can easily be a multi-axis type having a plurality of shafts and can easily be a continuous type. From the viewpoint of productivity, in the production method of the third present disclosure, it is preferable to perform the solvent removal step using a continuous dryer equipped with a polyaxial horizontal stirring vessel which has a plurality of shafts extending in the horizontal direction and stirring blades.

Since it is easy to increase the ratio (heat transfer area/effective volume) of the heat transfer area to the effective volume in the horizontal stirring dryer, the drying efficiency can be easily improved, and the productivity can be easily improved. The ratio (heat transfer area/effective volume) in the horizontal stirring dryer is preferably from 3 to 40, and more preferably from 10 to 40.

The heat transfer area is a total area of a portion where being able to apply heat to the particles, and is an area of a portion to which the particles in the stirring vessel can reach and which can be heated by a heat medium. The effective volume is a volume of a region in which particles can move inside the stirring vessel, and is obtained by subtracting the volume of parts such as the stirring blades and the shaft in the stirring vessel from the total volume inside the stirring vessel.

Figure 5:
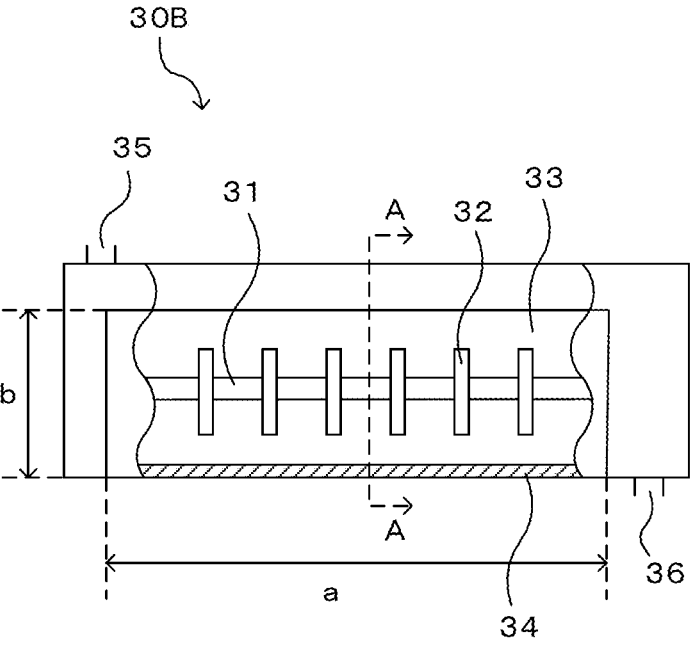
FIG. 5 is a schematic sectional view showing an example of a horizontal stirring dryer used in the production method of the third present disclosure.
Figure 6:
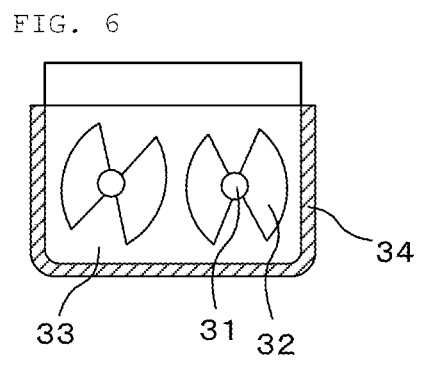

FIG. 5 is a schematic sectional view showing an example of a horizontal stirring dryer used in the production method of the third present disclosure, and FIG. 6 is an AA cross-sectional view of the horizontal stirring dryer shown in FIG. 5. The horizontal stirring dryer 30B shown in FIG. 5 and FIG. 6 includes a horizontal stirring vessel 33 having two horizontally extending shafts 31 and stirring blades 32 fixed to the shafts 31. In the horizontal stirring dryer 30B, a jacket 34 capable of flowing a heat medium covers the outer periphery of the stirring vessel 33. In the horizontal stirring dryer 30B shown in FIG. 5 and FIG. 6, the shape of the stirring vessel is a quadrangular prism shape, and the stirring blades are paddle-type. In the horizontal stirring dryer 30B shown in FIG. 5 and FIG. 6, the precursor particles supplied from the supply port 35 are stirred and dried in the stirring vessel 33 to be discharged from the discharge port 36 as hollow resin particles from which the hydrocarbon solvent has been removed.

In the horizontal stirring dryer, when the heat-resistant temperature of the gearbox is equal to or higher than the temperature of the heat medium, the installation position of the gearbox is not particularly limited. When the heat-resistant temperature of the gearbox is lower than the temperature of the heat medium, it is preferable that the gearbox is installed at a position not exposed to the heat medium, for example, it is preferable that the gearbox is installed outside the jacket.

Examples of commercially available horizontal stirring dryers which are preferably used include the product name "PADDLE DRYER" manufactured by Nara Machinery Co., Ltd., the product name "SOLID AIR (registered trademark) SJ" manufactured by Hosokawa Micron Corporation, the product name "CD DRYER" manufactured by Kurimoto, Ltd., and the like.

In the solvent removal step, the temperature $T_0$ of the heat-drying at the time of removing the hydrocarbon solvent from the precursor particles is a drying temperature set according to the drying apparatus to be used, and is the same as that of the above-mentioned production method of the first present disclosure. In the production method of the third present disclosure, the temperature $T_0$ of heat-drying in the solvent removal step preferably satisfies $T_1 \leq T_0 \leq (T_2-5)$, more preferably satisfies $(T_1+70) \leq T_0 \leq (T_2-5)$, and still more preferably satisfies $(T_1+140) \leq T_0 \leq (T_2-5)$, with respect to the boiling point $T_1$ (° C.) of the hydrocarbon solvent and the thermal decomposition initiation temperature $T_2$ (° C.) of the precursor particles.

The time of the heat-drying in this step is preferably from 30 minutes to 90 minutes, and more preferably from 30 minutes to 70 minutes, from the viewpoint of productivity.

In the production method of the third present disclosure, the thermal decomposition initiation temperature $T_2$ (° C.) of the precursor particles used in the solvent removal step, the pressure at the time of the heat-drying in the solvent removal step, the drying atmosphere when performing the heat-drying, and the amount of the precursor particles being heat-dried are the same as those of the above-mentioned production method of the first present disclosure.

The effective volume of the stirring vessel equipped in the horizontal stirring dryer used in the production method of the third present disclosure is preferably 3 m³ or more, and more preferably 5 m³ or more from the viewpoint of mass production, while, from the viewpoint of productivity, it is generally 20 m³ or less, and may be 15 m³ or less.

In the stirring-drying performed in the production method of the third present disclosure, from the viewpoint of suppressing breakage of the precursor particles or the hollow resin particles, the stirring blade tip speed calculated by the formula (iii) explained in the production method of the first present disclosure is preferably 2.0 m/s or less, more preferably 1.5 m/s or less, still more preferably 0.8 m/s or less, and even more preferably 0.6 m/s or less. From the viewpoint of improving productivity, the stirring blade tip speed is preferably 0.1 m/s or more, and more preferably 0.3 m/s or more.

In the stirring-drying performed by the production method of the third present disclosure, from the viewpoint of suppressing breakage of the precursor particles or the hollow resin particles, the rotation speed of the stirring blade is preferably 70 rpm or less, more preferably 40 rpm or less, and still more preferably 30 rpm or less. From the viewpoint of improving productivity, it is preferably 5 rpm or more, and more preferably 10 rpm or more.

In the production method of the third present disclosure, it is preferable that the solvent removal step is performed by heat-drying and stirring simultaneously the precursor particles in combination with at least one kind of fine particles selected from the group consisting of inorganic fine particles and organic fine particles in a stirring vessel to coat a surface of the precursor particles with the fine particles and remove the hydrocarbon solvent from the precursor particles, as in the case of performing stirring-drying in the production method of the first present disclosure described above.

Examples of the fine particles for coating the surface of the precursor particles include those used in the production method of the first present disclosure described above. The fine particles preferred in the production method of the first present disclosure can be similarly preferably used in the production method of the third present disclosure. Also, a preferable content of the fine particles is the same as that of the production method of the first present disclosure.

The production method of the third disclosure may further include other steps different from the steps (1) to (5). Examples of the other steps include the same steps as the other steps that the production method of the first present disclosure may include.

III-2. Hollow Resin Particles

In the hollow resin particles obtained by the production method of the third present disclosure, the shape, the volume average particle diameter, the particle size distribution, the void ratio, the hydrocarbon solvent residual rate, the shell thickness, the water content, and the fine particle coverage are the same as those of the hollow resin particles obtained by the production method of the first present disclosure described above.

On the other hand, according to the production method of the third present disclosure, the value (kg/(h·m³)) calculated by dividing the weight (kg) of the obtained hollow resin particles by the heat-drying time (h) performed in the solvent removal step, and further dividing the obtained value by the effective volume (m³) of the dryer, can be preferably 100 or more, more preferably 150 or more, and still more preferably 300 or more.

III-3. Applications of Hollow Resin Particles

The applications of the hollow resin particles obtained by the production method of the third present disclosure is, for example, the same as the applications of the hollow resin particles obtained by the production method of the first present disclosure described above. Suitable applications in the hollow resin particles obtained by the production method of the first present disclosure are likewise suitable in the hollow resin particles obtained by the production method of the third present disclosure.

EXAMPLES

Hereinbelow, the present invention is described more specifically using examples and comparative examples. However, the present invention is not limited to these examples. "Part(s)" and "%" are on a mass basis unless otherwise specified.

Example I Series

Production Example 1: Production of Polar Resin a
(MMA/AA/EA Copolymer)

First, 200 parts of toluene was put in a reaction container. While stirring the toluene, the gas inside the reaction container was sufficiently replaced with nitrogen. Then, the temperature of the toluene was raised to 90° C. Then, a mixed solution of 96.2 parts of methyl methacrylate (MMA), 0.3 parts of acrylic acid (AA), 3.5 parts of ethyl acrylate (EA) and 2.8 parts of t-butylperoxy-2-ethylhexanoate (manufactured by: Nippon Oil & Fats Co., Ltd., product name: PERBUTYL O) was added dropwise to the reaction container for two hours. Also, the condition of the mixture was maintained for 10 hours under toluene flux, thereby completing polymerization. Then, the solvent was removed by distillation under reduced pressure to obtain a polar resin A (an MMA/AA/EA copolymer).

Of the total mass (100%) of the repeating units constituting the obtained polar resin A (the MMA/AA/EA copolymer), the proportion of the MMA-derived repeating units was 96.2%; that of the AA-derived repeating units was 0.3%; and that of the EA-derived repeating units was 3.5%.

The number average molecular weight of the obtained polar resin A (the MMA/AA/EA copolymer) was 10000.

Example I-1

(1) Mixture Liquid Preparation Step

First, the following materials were mixed to produce an oil phase.

Methacrylic acid: 40 parts
Ethylene glycol dimethacrylate: 60 parts
2,2'-Azobis(2,4-dimethylvaleronitrile) (an oil-soluble polymerization initiator manufactured by Wako Pure Chemical Industries, Ltd., product name: V-65): 3 parts
Cyclohexane (boiling point 81° C.): 187 parts On the other hand, 3.0 parts of a surfactant was added to 650 parts of ion-exchanged water. The obtained mixture was used as an aqueous phase.

The obtained aqueous phase and oil phase were mixed, thereby preparing a mixture liquid.

(2) Suspension Step

The mixture liquid was stirred with an in-line emulsification disperser to be suspended, thereby preparing a suspension in which droplets of a polymerizable monomer composition, in which cyclohexane was encapsulated, were dispersed in water.

(3) Polymerization Step

The suspension was stirred in a nitrogen atmosphere at 65° C. for 4 hours, thereby performing a polymerization reaction. By this polymerization reaction, a precursor composition containing precursor particles including cyclohexane was prepared.

(4) Solid-Liquid Separation Step

By filtering the precursor composition, a cake of precursor particles separated from water was obtained.

(5) Solvent Removal Step 0.25 L of the cake of the obtained precursor particles was formed into a thickness of 0.1 cm, and placed in a shelf stage vacuum dryer, and heated and dried under an air atmosphere under the conditions shown in Table 1, thereby obtaining hollow resin particles of Example I-1.

Examples I-2 to I-5 and Comparative Examples I-1 to I-2

The hollow resin particles of Examples I-2 to I-5 and Comparative Examples I-1 to I-2 were produced in the same manner as Example I-1, except that the conditions of heat-drying performed in the above-mentioned "(5) Solvent removal step" were changed as shown in Table 1.

Examples I-6

The hollow resin particles of Example I-6 were produced in the same manner as Example I-1, except that the added amount of methacrylic acid was changed to 20 parts and the added amount of ethylene glycol dimethacrylate was changed to 80 parts when preparing the oil phase in the above "(1) Mixture liquid preparation step", and the conditions of heat-drying performed in the above "(5) Solvent removal step" were changed as shown in Table 1.

Examples I-7

The hollow resin particles of Example I-7 were produced in the same manner as Example I-1, except that the above-mentioned "(5) Solvent removal step" was changed as follows.

In the solvent removal step of Example I-7, 0.1 L of the cake (cake thickness: 3 cm) of the precursor particles obtained by the solid-liquid separation step was added into a stirring vessel of a vertical cylindrical stirring dryer, and heat-drying was performed under the conditions shown in Table 2.

The vertical cylindrical stirring dryer used in Example I-7 had a vertical cylindrical stirring vessel equipped with a full-zone type stirring blades fixed to the shaft extending in the gravity direction. Inside the stirring vessel, the ratio (b/a) of the maximum value b of the distance in the direction perpendicular to the shaft to the length a of the shaft was 1.67, and the effective volume of the stirring vessel was 0.0001 m³.

Examples I-8

The hollow resin particles of Example I-8 were produced in the same manner as Example I-7, except that 2.2 parts of calcium carbonate (average primary particle diameter: 20 nm, specific gravity: 2.71) was added when the cake of precursor particles was added into the stirring vessel of the vertical cylindrical stirring drier, and further, the time of heat-drying was changed as shown in Table 2.

Examples I-9

The hollow resin particles of Example I-9 were produced in the same manner as Example I-7, except that the added amount of methacrylic acid was changed to 20 parts and the added amount of ethylene glycol dimethacrylate was changed to 80 parts when preparing the oil phase in the above "(1) Mixture liquid preparation step".

Examples I-10

The hollow resin particles of Example I-10 were produced in the same manner as Example I-1, except that the above-mentioned "(5) Solvent removal step" was changed as follows.

In the solvent removal step of Example I-10, 50 L of the cake (cake thickness: 80 cm) of the precursor particles obtained by the solid-liquid separation step and 2.6 parts of calcium carbonate (average primary particle diameter: 20 nm) were added into a stirring vessel of a vertical conical stirring dryer, and heat-drying was performed under the conditions shown in Table 2 under an air atmosphere to obtain hollow resin particles of Example I-10.

The vertical conical stirring dryer used in Example I-10 had vertical conical stirring vessel equipped with spiral ribbon type stirring blades fixed to the shaft extending in the gravity direction. Inside the stirring vessel, the ratio (b/a) of the maximum value b of the distance in the direction perpendicular to the shaft to the length a of the shaft was 0.74, and the effective volume of the stirring vessel was 0.05 $m^3$.

Examples I-11

The hollow resin particles of Example I-11 were produced in the same manner as Example I-10, except that the "(1) Mixture liquid preparation step" and the "(4) Solid-liquid separation step" were changed as follows, and further, the conditions of heat-drying performed in the "(5) Solvent removal step" were changed as shown in Table 2.

In the mixture liquid preparation step in Example I-11, the following materials were mixed to produce an oil phase.

Ethylene glycol dimethacrylate: 100 parts

Polar resin A (the MMA/AA/EA copolymer) obtained in Production Example 1: 0.5 parts 2,2'-Azobis(2,4-dimethylvaleronitrile) (an oil-soluble polymerization initiator manufactured by Wako Pure Chemical Industries, Ltd., product name: V-65): 3 parts Cyclohexane: 120 parts On the other hand, in a stirring tank, under a room temperature condition (25° C.), an aqueous solution in which 5.5 parts of sodium hydroxide (an alkali metal hydroxide) was dissolved in 55 parts of ion-exchanged water, was gradually added under stirring to an aqueous solution in which 7.8 parts of magnesium chloride (a water-soluble polyvalent metal salt) was dissolved in 225 parts of ion-exchanged water, thereby preparing a magnesium hydroxide colloidal (a sparingly water-soluble metal hydroxide colloidal) dispersion (magnesium hydroxide: 4 parts). The obtained dispersion was used as an aqueous phase.

The obtained aqueous phase and oil phase were mixed, thereby preparing a mixture liquid.

In the solid-liquid separation step in Example I-11, the precursor composition obtained in the polymerization step was washed with dilute sulfuric acid (25° C., 10 minutes) to bring the pH of the composition to 5.5 or less, and then, water was separated therefrom by filtration. Next, 200 parts of ion-exchanged water was added to the resultant to make a slurry again, and a water washing treatment by separating water by filtration was repeatedly performed several times at room temperature (25° C.), thereby obtaining the cake of the precursor particles separated from water.

Examples I-12

The hollow resin particles of Example I-12 were produced in the same manner as Example I-10, except that calcium carbonate was not added into the stirring vessel and the time of heat-drying was changed to the time shown in Table 2.

Examples I-13

The hollow resin particles of Example I-13 were produced in the same manner as Example I-10, except that the added amount of methacrylic acid was changed to 20 parts and the added amount of ethylene glycol dimethacrylate was changed to 80 parts when preparing the oil phase in the above "(1) Mixture liquid preparation step", and calcium carbonate was not added into the stirring vessel and the time of heat-drying was changed to the time shown in Table 2.

Examples I-14

The hollow resin particles of Example I-14 were produced in the same manner as Example I-1, except that the above-mentioned "(5) Solvent removal step" was changed as follows.

In the solvent removal step of Example I-14, 12 L of the cake (cake thickness: 30 cm) of the precursor particles obtained by the solid-liquid separation step and 2.6 parts of calcium carbonate (average primary particle diameter: 20 nm) were added into a stirring vessel of a biaxial horizontal continuous stirring dryer, and heat-drying was performed under the conditions shown in Table 2 and under an air atmosphere, thereby obtaining hollow resin particles of Example I-14.

The biaxial horizontal continuous stirring dryer used in Example I-14 had a horizontal cylindrical stirring vessel equipped with two horizontally extending shafts and paddle-type heat transfer stirring blades fixed to the shafts. Inside the stirring vessel, the ratio (b/a) of the maximum value b of the distance in the direction perpendicular to the shaft to the length a of the shaft was 0.6, the effective volume of the stirring vessel was 12 $m^3$, and the ratio (heat transfer area/effective volume) of the heat transfer area to the effective volume was 25.8.

Examples I-15

The hollow resin particles of Example I-15 were produced in the same manner as Example I-14, except that the conditions for heat-drying were changed as shown in Table 2.

Examples I-16

The hollow resin particles of Example I-16 were produced in the same manner as Example I-14, except that the "(1) Mixture liquid preparation step" and the "(4) Solid-liquid separation step" were changed in the same manner as in Example I-11, and further, the conditions of heat-drying performed in the "(5) Solvent removal step" were changed as shown in Table 2.

Examples I-17

The hollow resin particles of Example I-17 were produced in the same manner as Example I-14, except that calcium carbonate was not added into the biaxial horizontal continuous stirring dryer and the time of heat-drying was changed to the time shown in Table 2.

Examples I-18

The hollow resin particles of Example I-18 were produced in the same manner as Example I-14, except that the added amount of methacrylic acid was changed to 20 parts and the added amount of ethylene glycol dimethacrylate was changed to 80 parts when preparing the oil phase in the above "(1) Mixture liquid preparation step", and calcium carbonate was not added into the biaxial horizontal continuous stirring dryer and the time of heat-drying was changed to the time shown in Table 2.

<Measurement of Precursor Particles>

In each Example and each Comparative Example, approximately 4 g of the precursor particles obtained by the solid-liquid separation step were collected, and the following measurements were performed prior to performing the solvent removal step.

A. Thermal Decomposition Initiation Temperature $(T_2)$ of Precursor Particles

Approximately 15 mg of the precursor particles obtained in the above "(4) Solid-liquid separation step" was precisely weighed to be a measurement sample. TG-DTA curve of the measurement sample was obtained by measuring the sample using the model type TG/DTA6200 (EXSTAR6000 series) manufactured by Seiko Instruments Inc. as the TG-DTA apparatus under an air atmosphere according to the following conditions.

Air flow rate: 230 mL/min
Temperature increasing rate: 10° C./min
Measurement temperature range: 30° C. to 800° C.

From the obtained TG-DTA curve, thermal decomposition initiation temperature was determined using analysis software attached to the apparatus.

B. Water Content of Precursor Particles

The water content of the precursor particles was calculated by the following formula (i) from the mass (w1) which was the precisely weighed mass of approximately 0.1 mg of the precursor particles obtained in the above "(4) Solid-liquid separation step", and the mass (w2) which was the mass precisely weighed again of the precursor particles after being dried at 105° C. for 1 hour and then cooled to 25° C. For the drying, a dryer in which the temperature error in the drying chamber was 1° C. or less was used.

$$\text{Water content (\%)} = \{(w1 - w2)/w1\} \times 100 \qquad \text{Formula (i)}$$

C. Permeability of Hydrocarbon Solvents from Precursor Particles

The permeability of the hydrocarbon solvent from the precursor particles was calculated by the following formula (ii) from the mass (w3) which was the precisely weighed mass of the approximately 0.1 mg of the precursor particles A obtained from approximately 3 g of the sampled precursor particles A which was obtained by static drying the precursor particles obtained in the above "(4) Solid-liquid separation step" at 40° C. for 24 hours and the mass (w4) which was the mass of the precursor particles B which was obtained by further static drying the precisely weighed precursor particles A at 105° C. for 2 hours and then cooling the particles to 25° C. For the drying, a dryer in which the temperature error in the drying chamber was 1° C. or less was used.

$$\text{Permeability (\%) of hydrocarbon solvent} = \{(w3 - w4)/w3\} \times 100 \qquad \text{Formula (ii)}$$

D. Volume Average Particle Diameter of Precursor Particles

The particle diameter of the precursor particles obtained in the above "(4) Solid-liquid separating step" was measured using a laser diffraction particle size distribution measuring apparatus (product name: SALD-2000, manufactured by Shimadzu Corporation), and the volume average thereof was calculated as the volume average particle diameter of the precursor particles.

<Measurement and Evaluation of Hollow Resin Particles>

The hollow resin particles obtained in each Example and each Comparative Example were measured and evaluated as follows.

1. SEM Observation of Hollow Resin Particles

Each of 100 particles of the hollow resin particles obtained in each Example and each Comparative Example were observed with SEM, and if the pores of 100 nm or more were present or absent on each particle surface was confirmed. When there were less than five hollow resin particles having pores of 100 nm or more, they were evaluated as the particle breakage was "absent". When there were five or more hollow resin particles having pores of 100 nm or more, they were evaluated as the particle breakage was "present".

2. Volume Average Particle Diameter of Hollow Resin Particles

The particle diameter of the hollow resin particles was measured using a laser diffraction particle size distribution measuring apparatus (product name: SALD-2000, manufactured by Shimadzu Corporation), and the volume average thereof was calculated as the volume average particle diameter of the hollow resin particles.

3. Density and Void Ratio of Hollow Resin Particles 3-1. Measurement of Apparent Density of Hollow Resin Particles First, approximately 30 cm³ of the hollow resin particles were added into a measuring flask with a volume of 100 cm³, and the mass of the added hollow resin particles was precisely weighed. Next, the measuring flask in which the hollow resin particles were added, was precisely filled with isopropanol up to the marked line while preventing air bubbles from getting in. The mass of the isopropanol added to the measuring flask was precisely weighed, and the apparent density $D_1$ (g/cm³) of the hollow resin particles was calculated by the following formula (I).

$$\text{Apparent density } D_1 = [\text{Mass of the hollow resin particles}]/(100 - [\text{Mass of the isopropanol}]/[\text{Specific gravity of the isopropanol at the measuring temperature}]) \qquad \text{Formula (I)}$$

3-2. Measurement of True Density of Hollow Resin Particles

The hollow resin particles were pulverized in advance; approximately 10 g of the pulverized hollow resin particles were added into a measuring flask with a volume of 100 cm³; and the mass of the added pulverized particles was precisely weighed.

After that, similarly to the measurement of the apparent density mentioned above, isopropanol was added to the measuring flask; the mass of the isopropanol was precisely weighed; and the true density $D_0$ (g/cm³) of the hollow resin particles was calculated by the following formula (II).

$$\text{True density } D_0 = [\text{Mass of the pulverized hollow resin particles}]/(100 - [\text{Mass of the isopropanol}]/[\text{Specific gravity of the isopropanol at the measuring temperature}]) \qquad \text{Formula (II)}$$

3-3. Calculation of Actual Measured Void Ratio

The actual measured void ratio of the hollow resin particles was calculated by the following formula (III) from the apparent density $D_1$ and true density $D_0$ of the hollow resin particles.

$$\text{Actual measured void ratio (\%)} = 100 - (\text{Apparent density } D_1/\text{True density } D_0) \times 100 \qquad \text{Formula (III)}$$

3-4. Calculation of Theoretical Void Ratio

The theoretical void ratio of the hollow resin particles was calculated by the following formula (IV) from the added amount Ws of the hydrocarbon solvent and the specific gravity Gs of the hydrocarbon solvent in the mixture liquid preparation step, and the added amount Wr of the raw material of the solid content constituting the hollow resin particles and the above-measured true density $D_0$ of the hollow resin particles.

$$\text{Theoretical void ratio (\%)} = (Ws/Gs)/\{(Ws/Gs) + (Wr/D_0)\} \times 100 \qquad \text{Formula (IV)}$$

The hydrocarbon solvent used in each Example and each Comparative Example was cyclohexane, and the specific gravity of cyclohexane was 0.778. As the added amount Wr of the raw material of the solid content constituting the hollow resin particles, the sum of the added amount of the polymerizable monomer, the polar resin and the calcium carbonate used as the fine particles was used.

4. Shell Thickness of Hollow Resin Particles

The inner diameter r was calculated by the following formula (1) from the volume average particle diameter $R_1$ and theoretical void ratio of the hollow resin particles, and the shell thickness was calculated by the following formula (2) from the inner diameter r and the volume average particle diameter $R_1$.

$$4/3\pi\times(R_1/2)^3\times\text{Theoretical void ratio}=4/3\pi\times(r/2)^3 \qquad \text{Formula (1)}$$

$$\text{Shell thickness}=(R_1-r)/2 \qquad \text{Formula (2)}$$

5. Hydrocarbon Solvent Residual Rate in Hollow Resin Particles

The hydrocarbon solvent residual rate in the hollow resin particles was calculated by the following formula (V) from the theoretical void ratio and actual measured void ratio of the hollow resin particles.

$$\text{Hydrocarbon solvent residual rate (\%)}=100-(\text{Actual measured void ratio/Theoretical void ratio})\times100 \qquad \text{Formula (V)}$$

6. Water Content of Hollow Resin Particles

The water content of the hollow resin particles was calculated by the following formula (i) from the mass (w1) which was the precisely weighed mass of approximately 0.1 mg of the hollow resin particles, and the mass (w2) which was the mass precisely weighed again of the hollow resin particles after being dried at 105° C. for 1 hour and then cooled to 25° C. For the drying, the same dryer as that used in determining the water content of the precursor particles was used.

7. Fine Particle Coverage of Hollow Resin Particles

In Examples where the addition of the fine particles was performed in the solvent removal step, the fine particle coverage (%) with respect to the surface area of the hollow resin particles was calculated by the following formula (A) from the volume average particle diameter $R_2$ (nm) of the hollow resin particles which were assumed not to contain the fine particles, the apparent density S (g/cm³) of the hollow resin particles which were assumed not to contain the fine particles or the hydrocarbon solvent, the average primary particle diameter d (nm) of the fine particles, and the specific gravity s and added amount n (part by mass) of the fine particles. The added amount n (parts by mass) of the fine particles was the added amount of the fine particles with respect to 100 parts by mass of the hollow resin particles assumed not to contain the fine particles or the hydrocarbon solvent.

$$\text{Fine particle coverage (\%)}=\{3^{1/2}/2\pi\}\times\{(R_2\times S)/(d\times s)\}\times n \qquad \text{Formula (A)}$$

As the volume average particle diameter $R_2$ (nm) of the hollow resin particles which were assumed not to contain the fine particles, the above-measured volume average particle diameter of the precursor particles was used.

The apparent density S (g/cm³) of the hollow resin particles which were assumed not to contain the fine particles or the hydrocarbon solvent was determined by using the same precursor particles as those used for producing the hollow resin particles, and measuring the apparent density of the precursor particles after being static dried for 24 hours at 230° C., by the same method as in "3-1. Measurement of apparent density of hollow resin particles" described above.

8. Productivity

As an index of productivity, the value (kg/(h·m³)) was calculated by dividing the weight (kg) of the obtained hollow resin particles by the heat-drying time (h) performed in the solvent removal step, and further dividing the obtained value by the effective volume (m³) of the dryer.

9. Adhesion of Powder to Stirring Blades

In Examples using the stirring dryer, immediately after the obtained hollow resin particles were taken out from the dryer, the stirring blades of the dryer were visually observed to confirm if the adhered powder is present or absent. The drying efficiency is more excellent when the stirring blades are free from the adhered powder.

10. Crushing Strength

The crushing strength of the obtained hollow resin particles was measured under the following test conditions using a fine particle crushing force measuring device NS-A100 type (manufactured by Nano Seeds Corporation).

(Test Conditions)

Measurement method: A sample of hollow resin particles was sprayed on a stage by free fall, and the crushing force was measured by a crushing needle.

Measured temperature: Room temperature (25° C.)

Analysis method: A waveform chart of the load F required for crushing the hollow resin particle was recorded by pushing a crushing needle into the sample of the hollow resin particle at a compression speed of 0.3 μm/s. The difference between the peak value during crushing and the baseline (when no load is applied) was taken as the crushing force F [N]. The crushing strength S [Pa] was calculated by the following formula (B).

$$S=2.8F/(\pi\times D^2) \qquad \text{Formula (B)}$$

where F is as described above, and D is the particle diameter [m] of the hollow resin particle. The distance from the tip of the crushing needle (indenter) to the stage (plan) when the crushing needle contacted the hollow resin particle was measured from the image at the time of measurement using image analysis software (product name: WinROOF, manufactured by MiLani Cuiporation), and the distance was determined as the particle diameter D of the hollow resin particle.

The higher the crushing strength, the higher the strength of the hollow resin particles.

TABLE 1

|  |  |  | Example I-1 | Example I-2 | Example I-3 | Example I-4 | Example I-5 | Example I-6 | Comparative Example I-1 | Comparative Example I-2 |
|---|---|---|---|---|---|---|---|---|---|---|
| Polymerizable monomer | Crosslinkable monomer | % by mass | 60 | 60 | 60 | 60 | 60 | 80 | 60 | 60 |
| Precursor particles | Thermal decomposition initiation temperature | ° C. | 255 | 255 | 255 | 255 | 255 | 255 | 255 | 255 |

TABLE 1-continued

| | | | Example I-1 | Example I-2 | Example I-3 | Example I-4 | Example I-5 | Example I-6 | Comparative Example I-1 | Comparative Example I-2 |
|---|---|---|---|---|---|---|---|---|---|---|
| | Water content | % | 43 | 43 | 43 | 43 | 43 | 43 | 43 | 43 |
| | Permeability of hydrocarbon solvent | % | 0 | 0 | 0 | 0 | 0 | 0 | 0 | 0 |
| Heat-drying conditions | Dryer | | | | | Shelf stage vacuum dryer | | | | |
| | Drying temperature | °C. | 160 | 160 | 160 | 220 | 220 | 220 | 105 | 280 |
| | Drying time | min | 1500 | 1320 | 900 | 60 | 30 | 60 | 720 | 50 |
| | Drying pressure | kPa | 101 | 71 | 41 | 101 | 6 | 101 | 101 | 101 |
| | Cake thickness | cm | 0.1 | 0.1 | 0.1 | 0.1 | 0.1 | 0.1 | 0.1 | 0.1 |
| | Cake amount | L | 0.25 | 0.25 | 0.25 | 0.25 | 0.25 | 0.25 | 0.25 | 0.25 |
| Hollow resin particles | Particle breakage | | Absent | Absent | Absent | Absent | Absent | Absent | Absent | Present |
| | Dv | μm | 3.2 | 3.2 | 3.2 | 3.2 | 3.2 | 4.2 | 3.2 | 3.2 |
| | Actual measured void ratio | % | 74 | 74 | 74 | 74 | 74 | 74 | 0 | — |
| | Theoretical void ratio | % | 74 | 74 | 74 | 74 | 74 | 74 | 74 | — |
| | Shell thickness | μm | 0.12 | 0.12 | 0.12 | 0.12 | 0.12 | 0.12 | 0.12 | 0.12 |
| | Hydrocarbon solvent residual rate | % | 0 | 0 | 0 | 0 | 0 | 0 | 100 | — |
| | Water content | % | <1 | <1 | 1 | <1 | <1 | <1 | <1 | <1 |
| | Crushing strength | MPa | 4 | 4 | 4 | 4 | 4 | 7 | — | — |
| | Productivity | kg/(h · m³) | 0.01 | 0.02 | 0.02 | 0.33 | 0.67 | 0.33 | — | — |

TABLE 2

| | | | Example I-7 | Example I-8 | Example I-9 | Example I-10 | Example I-11 | Example I-12 |
|---|---|---|---|---|---|---|---|---|
| Polymerizable monomer | Crosslinkable monomer | % by mass | 60 | 60 | 80 | 60 | 100 | 60 |
| Precursor particles | Thermal decomposition initiation temperature | °C. | 255 | 255 | 255 | 255 | 256 | 255 |
| | Water content | % | 43 | 43 | 43 | 43 | 15 | 43 |
| | Permeability of hydrocarbon solvent | % | 0 | 0 | 0 | 0 | 5 | 0 |
| Heat-drying conditions | Dryer | | Vertical cylindrical stirring dryer | | | Vertical conical stirring dryer | | |
| | Drying temperature | °C. | 180 | 180 | 180 | 230 | 230 | 230 |
| | Drying time | min | 780 | 420 | 780 | 160 | 90 | 210 |
| | Drying pressure | kPa | 71 | 71 | 71 | 10 | 10 | 10 |
| | Rotation speed of stirring blade | rpm | 60 | 60 | 60 | 68 | 68 | 68 |
| | Stirring blade tip speed | m/s | 0.15 | 0.15 | 0.15 | 1.74 | 1.74 | 1.74 |
| | Cake thickness | | 3 | 3 | 3 | 80 | 80 | 80 |
| | Cake amount | L | 0.1 | 0.1 | 0.1 | 50 | 50 | 50 |
| | Calcium carbonate | Parts by mass | None | 2.2 | None | 2.6 | 1.4 | None |
| Hollow resin particles | Particle breakage | | Absent | Absent | Absent | Absent | Absent | Absent |
| | Dv | μm | 3.2 | 3.2 | 4.2 | 3.2 | 9.0 | 3.2 |
| | Actual measured void ratio | % | 74 | 74 | 74 | 74 | 65 | 74 |
| | Theoretical void ratio | % | 74 | 74 | 74 | 74 | 65 | 74 |
| | Shell thickness | μm | 0.12 | 0.12 | 0.12 | 0.12 | 0.66 | 0.12 |
| | Hydrocarbon solvent residual rate | % | 0 | 0 | 0 | 0 | 0 | 0 |
| | Water content | % | <1 | <1 | <1 | <1 | <1 | <1 |
| | Fine particle coverage | % | — | 68 | — | 68 | 68 | — |
| | Crushing strength | MPa | 4 | 4 | 7 | 4 | 12 | 4 |
| | Productivity | kg/(h · m³) | 3.08 | 5.71 | 3.08 | 43 | 76 | 33 |
| Adhesion of powder to stirring blades | | | Present | Absent | Present | Absent | Absent | Present |

TABLE 2-continued

|  |  |  | Example I-13 | Example I-14 | Example I-15 | Example I-16 | Example I-17 | Example I-18 |
|---|---|---|---|---|---|---|---|---|
| Polymerizable monomer | Crosslinkable monomer | % by mass | 80 | 60 | 60 | 100 | 60 | 80 |
| Precursor particles | Thermal decomposition initiation temperature | ° C. | 255 | 255 | 255 | 256 | 255 | 255 |
|  | Water content | % | 43 | 43 | 43 | 15 | 43 | 43 |
|  | Permeability of hydrocarbon solvent | % | 0 | 0 | 0 | 5 | 0 | 0 |
| Heat-drying conditions | Dryer |  | Vertical conical stirring dryer | Biaxial horizontal continuous stirring dryer | | | | |
|  | Drying temperature | ° C. | 230 | 230 | 250 | 250 | 230 | 230 |
|  | Drying time | min | 210 | 70 | 50 | 30 | 90 | 90 |
|  | Drying pressure | kPa | 10 | 101 | 101 | 101 | 101 | 101 |
|  | Rotation speed of stirring blade | rpm | 68 | 30 | 30 | 30 | 30 | 30 |
|  | Stirring blade tip speed | m/s | 1.74 | 0.31 | 0.31 | 0.31 | 0.31 | 0.31 |
|  | Cake thickness |  | 80 | 30 | 30 | 30 | 30 | 30 |
|  | Cake amount | L | 50 | 12 | 12 | 12 | 12 | 12 |
|  | Calcium carbonate | Parts by mass | None | 2.6 | 2.6 | 1.4 | None | None |
| Hollow resin particles | Particle breakage |  | Absent | Absent | Absent | Absent | Absent | Absent |
|  | Dv | μm | 4.2 | 3.2 | 3.2 | 9.0 | 3.2 | 4.2 |
|  | Actual measured void ratio | % | 74 | 74 | 74 | 65 | 74 | 74 |
|  | Theoretical void ratio | % | 74 | 74 | 74 | 65 | 74 | 74 |
|  | Shell thickness | μm | 0.12 | 0.12 | 0.12 | 0.66 | 0.12 | 0.12 |
|  | Hydrocarbon solvent residual rate | % | 0 | 0 | 0 | 0 | 0 | 0 |
|  | Water content | % | <1 | <1 | <1 | <1 | <1 | <1 |
|  | Fine particle coverage | % | — | — | 68 | 68 | — | — |
|  | Crushing strength | MPa | 7 | 4 | 4 | 12 | 4 | 7 |
|  | Productivity | kg/(h · m³) | 33 | 129 | 180 | 400 | 100 | 100 |
| Adhesion of powder to stirring blades | | | Present | Absent | Absent | Absent | Present | Present |

40

Consideration

In Comparative Example I-1, since the temperature of the heat-drying for removing the hydrocarbon solvent was too low, a large amount of the hydrocarbon solvent remained inside the obtained hollow resin particles. Since the hollow resin particles obtained in Comparative Example I-1 had a large specific gravity due to the inclusion of the hydrocarbon solvent in the hollow portion, the above-mentioned value (kg/(h·m³)) could not be used as an index of productivity, and they were not worth measuring the crushing strength.

In Comparative Example I-2, since the temperature of the heat-drying for removing the hydrocarbon solvent was too high, the obtained hollow resin particles had many pores of 100 nm or more in the shell and had many breakages. Since the hollow resin particles obtained in Comparative Example I-2 had many breakages, it was not possible to determine the void ratio and the hydrocarbon solvent residual ratio thereof. Further, in Comparative Example I-2, since the obtained hollow resin particles had many breakages and the desired hollow resin particles were not obtained, the above-mentioned values (kg/(h·m³)) serving as an index of productivity were not calculated, and the crushing strength was not measured.

In Examples I-1 to I-18, in producing the hollow resin particles by the suspension polymerization method, the content ratio of the crosslinkable monomers contained in the polymerizable monomer was from 40% by mass to 100% by mass, and the temperature $T_0$ of the heat-drying for removing the hydrocarbon solvent satisfied $(T_1+70) \leq T_0 \leq (T_2-5)$ with respect to the boiling point $T_1$ (° C.) of the hydrocarbon solvent and the thermal decomposition initiation temperature $T_2$ (° C.) of the precursor particles. Accordingly, the obtained hollow resin particles were spherical without breakage, and the hydrocarbon solvent was sufficiently removed.

Among them, Examples I-7 to I-18 were excellent in productivity because heat-drying for removing the hydrocarbon solvent was performed by stirring-drying. When Example I-8, Examples I-10 to I-11, and Examples I-14 to I-16 were compared with Example I-7, Example I-12, and Example I-17, respectively, in which the same stirring apparatus were used, the productivity was further improved in Example I-8, Examples I-10 to I-11 and Examples I-14 to I-16, in which stirring-drying of precursor particles was performed together with fine particles. This was considered because, at the time of stirring-drying, the surface of the precursor particles was coated with fine particles, so that the flowability of the precursor particles improved, and as a result, the drying removal efficiency of the hydrocarbon solvent improved, and further, the powder adhesion to the stirring blades was suppressed.

When Examples I-11, and Example I-16 were compared with Examples I-10 and I-12, and Examples I-14, I-15 and I-17, respectively, in which the same stirring apparatus were used, the productivity was further improved in Examples I-11 and I-16, in which the permeability of the hydrocarbon solvent was 5%. In Examples I-11 and I-16, it was considered that the shell slightly permeated through the hydrocarbon solvent at 105° C., thereby improving the efficiency of removing the hydrocarbon solvent from the precursor particles.

In Examples I-6, I-9, 1-11, I-13, I-16 and I-18, in which the content ratio of crosslinkable monomers contained in the polymerizable monomer used for producing the hollow resin particles was relatively large, the crushing strength of the hollow resin particles improved. This was considered because the strength of the hollow resin particle was improved due to an increase in the content ratio of the crosslinkable monomer units occupying the shell of the hollow resin particles.

Example II Series

Examples II-1

The hollow resin particles of Example II-1 were produced in the same manner as Example I-10 in the above Example I series.

Examples II-2

The hollow resin particles of Example II-2 were produced in the same manner as Example I-11 in the above Example I series.

Examples II-3

The hollow resin particles of Example II-3 were produced in the same manner as Example I-12 in the above Example I series.

Examples II-4

The hollow resin particles of Example II-4 were produced in the same manner as Example I-7 in the above Example I series, except that heat-drying conditions were changed as shown in Table 3.

Examples II-5

The hollow resin particles of Example II-5 were produced in the same manner as Example I-8 in the above Example I series, except that heat-drying conditions were changed as shown in Table 3.

Comparative Examples II-1 to II-5

The hollow resin particles of Comparative Examples II-1 to II-5 were produced in the same manner as Example II-1, except that the solvent removal step was changed as follows.

In the solvent removal step of Comparative Examples II-1 to II-5, the cake of the precursor particles obtained by the solid-liquid separation step was molded in an amount shown in Table 3 and to the thickness shown in Table 3, and the cake was installed in a shelf stage vacuum dryer and heat-dried under the conditions shown in Table 3.

<Measurement of Precursor Particles>

The precursor particles obtained in the solid-liquid separation step in each Example and each Comparative Example, were measured in the same manner as in the above Example I series.

<Measurement and Evaluation of Hollow Resin Particles>

The hollow resin particles obtained in each Example and each Comparative Example were measured and evaluated in the same manner as in the above Example I series.

TABLE 3

| | | | Example II-1 | Example II-2 | Example II-3 | Example II-4 | Example II-5 |
|---|---|---|---|---|---|---|---|
| Polymerizable monomer | Crosslinkable monomer | % by mass | 60 | 100 | 60 | 60 | 60 |
| Precursor particles | Thermal decomposition initiation temperature | C | 255 | 256 | 255 | 255 | 255 |
| | Water content | % | 43 | 15 | 43 | 43 | 43 |
| | Permeability of hydrocarbon solvent | % | 0 | 5 | 0 | 0 | 0 |
| Heat-drying conditions | Dryer | | Vertical conical stirring dryer | | | Vertical cylindrical stirring dryer | |
| | Drying temperature | ° C. | 230 | 230 | 230 | 240 | 240 |
| | Drying time | min | 160 | 90 | 210 | 150 | 80 |
| | Drying pressure | kPa | 10 | 10 | 10 | 71 | 71 |
| | Rotation speed of stirring blade | rpm | 68 | 68 | 68 | 60 | 60 |
| | Stirring blade tip speed | m/s | 1.74 | 1.74 | 1.74 | 0.15 | 0.15 |
| | Cake thickness | cm | 80 | 80 | 80 | 3 | 3 |
| | Cake amount | L | 50 | 50 | 50 | 0.1 | 0.1 |
| | Calcium carbonate | Parts by mass | 2.6 | 1.4 | None | None | 2.2 |

TABLE 3-continued

| | | | | | | | |
|---|---|---|---|---|---|---|---|
| Hollow resin particles | Particle breakage | | Absent | Absent | Absent | Absent | Absent |
| | Dv | μm | 3.2 | 9.0 | 3.2 | 3.2 | 3.2 |
| | Actual measured void ratio | % | 74 | 65 | 74 | 74 | 74 |
| | Theoretical void ratio | % | 74 | 65 | 74 | 74 | 74 |
| | Shell thickness | μm | 0.12 | 0.66 | 0.12 | 0.12 | 0.12 |
| | Hydrocarbon solvent residual rate | % | 0 | 0 | 0 | 0 | 0 |
| | Water content | % | <1 | <1 | <1 | <1 | <1 |
| | Fine particle coverage | % | 68 | 68 | — | — | 68 |
| | Crushing strength | MPa | 4 | 12 | 4 | 4 | 4 |
| | Productivity | kg/(h · m³) | 43 | 76 | 33 | 16 | 30 |
| Adhesion of powder to stirring blades | | | Absent | Absent | Present | Present | Absent |

| | | | Comparative Example II-1 | Comparative Example II-2 | Comparative Example II-3 | Comparative Example II-4 | Comparative Example II-5 |
|---|---|---|---|---|---|---|---|
| Polymerizable monomer | Crosslinkable monomer | % by mass | 60 | 60 | 60 | 60 | 60 |
| Precursor particles | Thermal decomposition initiation temperature | C | 255 | 255 | 255 | 255 | 255 |
| | Water content | % | 43 | 43 | 43 | 43 | 43 |
| | Permeability of hydrocarbon solvent | % | 0 | 0 | 0 | 0 | 0 |
| Heat-drying conditions | Dryer | | Shelf stage vacuum dryer | | | | |
| | Drying temperature | ° C. | 180 | 180 | 230 | 230 | 280 |
| | Drying time | min | 160 | 160 | 120 | 20 | 50 |
| | Drying pressure | kPa | 101 | 101 | 101 | 101 | 101 |
| | Rotation speed of stirring blade | rpm | — | — | — | — | — |
| | Stirring blade tip speed | m/s | — | — | — | — | — |
| | Cake thickness | cm | 4 | 0.1 | 4 | 0.1 | 0.1 |
| | Cake amount | L | 10 | 0.25 | 10 | 0.25 | 0.25 |
| | Calcium carbonate | Parts by mass | None | None | None | None | None |
| Hollow resin particles | Particle breakage | | Absent | Absent | Absent | Absent | Present |
| | Dv | μm | 3.2 | 3.2 | 3.2 | 3.2 | 3.2 |
| | Actual measured void ratio | % | 8.4 | 48 | 70 | 70 | — |
| | Theoretical void ratio | % | 70 | 70 | 70 | 70 | — |
| | Shell thickness | μm | 0.12 | 0.12 | 0.12 | 0.12 | 0.12 |
| | Hydrocarbon solvent residual rate | % | 88 | 31 | 0 | 0 | — |
| | Water content | % | <1 | <1 | <1 | <1 | <1 |
| | Fine particle coverage | % | — | — | — | — | — |
| | Crushing strength | MPa | — | — | 4 | 4 | — |
| | Productivity | kg/(h · m³) | — | — | 7 | 1 | — |
| Adhesion of powder to stirring blades | | | — | — | — | — | — |

Consideration

In Comparative Examples II-1 to II-5, heat-drying for removing the hydrocarbon solvent was performed by static drying, and stirring-drying in a vertical stirring method was not performed. In Comparative Examples II-1 and II-2, static drying was performed at 180° C. for the same drying time as in Example II-1. As a result, a large amount of the hydrocarbon solvent remained in the obtained hollow resin particles even if the amount of the precursor particles at the time of drying was reduced. Since the hollow resin particles obtained in Comparative Examples II-1 and II-2 had a large specific gravity due to the inclusion of the hydrocarbon solvent in the hollow portion, the above-mentioned value (kg/(h·m³)) could not be used as an index of productivity, and they were not worth measuring the crushing strength.

In Comparative Examples II-3 and II-4, static drying was performed at 230° C. As a result, it was possible to remove the hydrocarbon solvent from the hollow resin particles; however, the productivity was inferior.

In Comparative Example II-5, static drying was performed at 280° C. As a result, the obtained hollow resin particles had many pores of 100 nm or more in the shell and had many breakages. In Comparative Example II-5, since the obtained hollow resin particles had many breakages and the desired hollow resin particles were not obtained, the above-mentioned value (kg/(h·m³)) serving as index of productivity was not calculated, and the crushing strength was not measured.

In Examples II-1 to II-5, in producing the hollow resin particles by the suspension polymerization method, the content ratio of the crosslinkable monomers contained in the polymerizable monomer was from 40% by mass to 100% by mass, and the heat-drying for removing the hydrocarbon solvent was performed while stirring the precursor particles in the vertical stirring vessel. Accordingly, the obtained hollow resin particles were spherical without breakage, and the hydrocarbon solvent was sufficiently removed, and further, the productivity was excellent.

Among them, when Examples II-1 and II-2, and Example II-5 were compared with Example II-3, and Example II-4, respectively, in which the same stirring apparatus were used, the productivity was further improved in Examples II-1 and II-2, and Example II-5 in which stirring-drying of precursor particles were performed together with fine particles. This was considered because, at the time of stirring-drying, the surface of the precursor particles was coated with fine particles, so that the flowability of the precursor particles improved, and as a result, the drying removal efficiency of the hydrocarbon solvent improved, and further, the powder adhesion to the stirring blades was suppressed.

When Example II-2 was compared with Examples II-1 and II-3 in which the same stirring apparatus were used, productivity was further improved in Example II-2 in which the permeability of the hydrocarbon solvent was 5%. In Example II-2, it was considered that the shell slightly permeated through the hydrocarbon solvent at 105° C., thereby improving the efficiency of removing the hydrocarbon solvent from the precursor particles.

In Example II-2, in which the content ratio of crosslinkable monomers contained in the polymerizable monomer used for producing the hollow resin particles was relatively large, the crushing strength of the hollow resin particles improved. This was considered because the strength of the hollow resin particle was improved due to an increase in the content ratio of the crosslinkable monomer units occupying the shell of the hollow resin particles.

Example III Series

Examples III-1

The hollow resin particles of Example III-1 were produced in the same manner as Example I-14 in the above Example I series.

Examples III-2

The hollow resin particles of Example III-2 were produced in the same manner as Example I-15 in the above Example I series.

Examples III-3

The hollow resin particles of Example III-3 were produced in the same manner as Example I-16 in the above Example I series.

Examples III-4

The hollow resin particles of Example III-4 were produced in the same manner as Example I-17 in the above Example I series.

Comparative Examples III-1 to III-5

The hollow resin particles of Comparative Examples III-1 to III-5 were produced in the same manner as Example III-1, except that the solvent removal step was changed as follows.

In the solvent removal step of Comparative Examples III-1 to III-5, the cake of the precursor particles obtained by the solid-liquid separation step was molded in an amount shown in Table 4 and to the thickness shown in Table 4, and the cake was installed in a shelf stage vacuum dryer and heat-dried under the conditions shown in Table 4.

<Measurement of Precursor Particles>

The precursor particles obtained in the solid-liquid separation step in each Example and each Comparative Example, were measured in the same manner as in the above Example I series.

<Measurement and Evaluation of Hollow Resin Particles>

The hollow resin particles obtained in each Example and each Comparative Example were measured and evaluated in the same manner as in the above Example I series.

TABLE 4

| | | | Example III-1 | Example III-2 | Example III-3 | Example III-4 | Comparative Example III-1 |
|---|---|---|---|---|---|---|---|
| Polymerizable monomer | Crosslinkable monomer | % by mass | 60 | 60 | 100 | 60 | 60 |
| Precursor particles | Thermal decomposition initiation temperature | ° C. | 255 | 255 | 256 | 255 | 255 |
| | Water content | % | 43 | 43 | 15 | 43 | 43 |
| | Permeability of hydrocarbon solvent | % | 0 | 0 | 5 | 0 | 0 |

TABLE 4-continued

| Heat-drying conditions | Dryer | | Biaxial horizontal continuous stirring dryer | | | | Shelf stage vacuum dryer |
|---|---|---|---|---|---|---|---|
| | Drying temperature | °C. | 230 | 250 | 250 | 230 | 180 |
| | Drying time | min | 70 | 50 | 30 | 90 | 70 |
| | Drying pressure | — | 101 | 101 | 101 | 101 | 101 |
| | Rotation speed of stirring blade | rpm | 30 | 30 | 30 | 30 | — |
| | Stirring blade tip speed | m/s | 0.31 | 0.31 | 0.31 | 0.31 | — |
| | Cake thickness | cm | 30 | 30 | 30 | 30 | 4 |
| | Cake amount | L | 12 | 12 | 12 | 12 | 10 |
| | Calcium carbonate | Parts by mass | 2.6 | 2.6 | 1.4 | None | None |
| Hollow resin particles | Particle breakage | | Absent | Absent | Absent | Absent | Absent |
| | | μm | 3.2 | 3.2 | 9.0 | 3.2 | 3.2 |
| | Actual measured void ratio | % | 74 | 74 | 65 | 74 | 0 |
| | Theoretical void ratio | % | 74 | 74 | 65 | 74 | 70 |
| | Shell thickness | μm | 0.12 | 0.12 | 0.66 | 0.12 | 0.12 |
| | Hydrocarbon solvent residual rate | % | 0 | 0 | 0 | 0 | 100 |
| | Water content | % | <1 | <1 | <1 | <1 | <1 |
| | Fine particle coverage | % | 68 | 68 | 68 | | — |
| | Crushing strength | MPa | 4 | 4 | 12 | 4 | — |
| | Productivity | kg/(h · m³) | 129 | 180 | 400 | 100 | — |
| Adhesion of powder to stirring blades | | | Absent | Absent | Absent | Present | — |

| | | | Comparative Example III-2 | Comparative Example III-3 | Comparative Example III-4 | Comparative Example III-5 |
|---|---|---|---|---|---|---|
| Polymerizable monomer | Crosslinkable monomer | % by mass | 60 | 60 | 60 | 60 |
| Precursor particles | Thermal decomposition initiation temperature | °C. | 255 | 255 | 255 | 255 |
| | Water content | % | 43 | 43 | 43 | 43 |
| | Permeability of hydrocarbon solvent | % | 0 | 0 | 0 | 0 |
| Heat-drying conditions | Dryer | | Shelf stage vacuum dryer | | | |
| | Drying temperature | °C. | 180 | 230 | 230 | 280 |
| | Drying time | min | 70 | 70 | 20 | 50 |
| | Drying pressure | — | 101 | 101 | 101 | 101 |
| | Rotation speed of stirring blade | rpm | — | — | — | — |
| | Stirring blade tip speed | m/s | — | — | — | — |
| | Cake thickness | cm | 0.1 | 4 | 0.1 | 0.1 |
| | Cake amount | L | 0.25 | 10 | 0.25 | 0.25 |
| | Calcium carbonate | Parts by mass | None | None | None | None |
| Hollow resin particles | Particle breakage | | Absent | Absent | Absent | Present |
| | | μm | 3.2 | 3.2 | 3.2 | 3.2 |
| | Actual measured void ratio | % | 20 | 39 | 70 | — |
| | Theoretical void ratio | % | 70 | 70 | 70 | — |
| | Shell thickness | μm | 0.12 | 0.12 | 0.12 | 0.12 |
| | Hydrocarbon solvent residual rate | % | 72 | 44 | 0 | — |

TABLE 4-continued

|  |  |  |  |  |  |
|---|---|---|---|---|---|
| Water content | % | <1 | <1 | <1 | <1 |
| Fine particle coverage | % | — | — | — | — |
| Crushing strength | MPa | — | — | 4 | — |
| Productivity | kg/(h · m³) | — | — | 1 | — |
| Adhesion of powder to stirring blades |  | — | — | — | — |

Consideration

In Comparative Examples III-1 to III-5, heat-drying for removing the hydrocarbon solvent was performed by static drying, and stirring-drying in a horizontal stirring method was not performed. In Comparative Examples III-1 and III-2, static drying was performed at 180° C. for the same drying time as in Example III-1. As a result, a large amount of the hydrocarbon solvent remained in the obtained hollow resin particles even if the amount of the precursor particles at the time of drying was reduced. In Comparative Examples III-3 and III-4, static drying was performed at 230° C. As a result, in Comparative Example III-3 in which the amount of the precursor particles at the time of drying was 10 L, a large amount of the hydrocarbon solvent remained in the obtained hollow resin particles. In Comparative Example III-4, in which the amount of the precursor particles at the time of drying was reduced to 0.25 L, it was possible to remove the hydrocarbon solvent from the hollow resin particles; however, the productivity was inferior. Since the hollow resin particles obtained in Comparative Examples III-1 to III-3 had a large specific gravity due to the inclusion of the hydrocarbon solvent in the hollow portion, the above-mentioned value (kg/(h·m³)) could not be used as an index of productivity, and they were not worth measuring the crushing strength.

In Comparative Example III-5, static drying was performed at 280° C. As a result, the obtained hollow resin particles had many pores of 100 nm or more in the shell and had many breakages. In Comparative Example III-5, since the obtained hollow resin particles had many breakages and the desired hollow resin particles were not obtained, the above-mentioned value (kg/(h·m³)) serving as index of productivity was not calculated, and the crushing strength was not measured.

In Examples III-1 to III-4, in producing the hollow resin particles by the suspension polymerization method, the content ratio of the crosslinkable monomers contained in the polymerizable monomer was from 40% by mass to 100% by mass, and the heat-drying for removing the hydrocarbon solvent was performed while stirring the precursor particles in the horizontal stirring vessel. Accordingly, the obtained hollow resin particles were spherical without breakage, and the hydrocarbon solvent was sufficiently removed, and further, the productivity was excellent.

Among them, when Examples III-1 to III-3 were compared with Example III-4, the productivity was further improved in Examples III-1 to III-3 in which stirring-drying of precursor particles was performed together with fine particles. This was considered because, at the time of stirring-drying, the surface of the precursor particles was coated with fine particles, so that the flowability of the precursor particles improved, and as a result, the drying removal efficiency of the hydrocarbon solvent improved, and further, the powder adhesion to the stirring blades was suppressed.

When Example III-3 was compared with Examples III-1, III-2 and III-4, productivity was further improved in Example III-3 in which the permeability of the hydrocarbon solvent was 5%. In Example III-3, it was considered that the shell slightly permeated through the hydrocarbon solvent at 105° C., thereby improving the efficiency of removing the hydrocarbon solvent from the precursor particles.

In Example III-3, in which the content ratio of crosslinkable monomers contained in the polymerizable monomer used for producing the hollow resin particles was relatively large, the crushing strength of the hollow resin particles improved. This was considered because the strength of the hollow resin particle was improved due to an increase in the content ratio of the crosslinkable monomer units occupying the shell of the hollow resin particles.

REFERENCE SIGNS LIST

1. Aqueous medium
2. Low polarity material
3. Suspension stabilizer
4. Polymerizable monomer composition
4a. Hydrocarbon solvent
4b. Material other than hydrocarbon solvent
4c. Polymerizable monomer dissolved out in aqueous medium
5. Polymerization initiator
6. Shell
7. Hollow portion
10. Droplet of polymerizable monomer composition
20. Precursor particle
30A. Vertical stirring dryer
30B. Horizontal stirring dryer
31. Shaft
32. Stirring blade
33. Stirring vessel
34. Jacket
35. Supply port
36. Discharge port
100. Hollow resin particle

The invention claimed is:
1. A method for producing hollow resin particles, the method comprising:
    preparing a mixture liquid containing a polymerizable monomer, a hydrocarbon solvent, a polymerization initiator and an aqueous medium,
    suspending the mixture liquid to prepare a suspension in which droplets of a polymerizable monomer composition containing the polymerizable monomer, the hydrocarbon solvent and the polymerization initiator are dispersed in the aqueous medium,
    subjecting the suspension to a polymerization reaction to prepare a precursor composition containing precursor particles having a hollow portion and including the hydrocarbon solvent in the hollow portion, performing solid-liquid separation of the precursor com-
position to obtain the precursor particles separated from
the aqueous medium, and heat-drying the precursor particles separated from the
aqueous medium to remove the hydrocarbon solvent
from the precursor particles, wherein the polymerizable monomer contains a crosslink-
able monomer in an amount of from 40% by mass to
100% by mass, wherein, with respect to a boiling point $T_1$ (° C.) of the
hydrocarbon solvent and a thermal decomposition ini-
tiation temperature $T_2$ (° C.) of the precursor particles,
a temperature $T_0$ (° C.) of the heat-drying for the
removal of the hydrocarbon solvent satisfies $(T_1+70)$
$\leq T_0 \leq (T_2-5)$, and wherein the removal of the hydrocarbon solvent is per-
formed by heat-drying and stirring simultaneously the
precursor particles separated from the aqueous medium
in combination with at least one kind of fine particles
selected from the group consisting of inorganic fine
particles and organic fine particles in a stirring vessel to coat a surface of the precursor particles with the fine
particles and remove the hydrocarbon solvent from the
precursor particles.

2. The method for producing the hollow resin particles
according to claim 1, wherein the boiling point $T_1$ of the
hydrocarbon solvent is from 70° C. to 90° C.

3. The method for producing the hollow resin particles
according to claim 1, wherein a void ratio of the hollow resin
particles is from 50% to 95%.

4. The method for producing the hollow resin particles
according to claim 1, wherein a pressure applied during the
heat-drying for the removal of the hydrocarbon solvent is
from 0 kPa to 101.3 kPa.

5. The method for producing the hollow resin particles
according to claim 1, wherein the hydrocarbon solvent is a
hydrocarbon solvent having 4 to 7 carbon atoms.

6. The method for producing the hollow resin particles
according to claim 1, wherein a water content of the pre-
cursor particles used in the removal of the hydrocarbon
solvent is 50% or less.

* * * * *